United States Patent
Baez et al.

(10) Patent No.: US 11,075,870 B1
(45) Date of Patent: Jul. 27, 2021

(54) DATA RETENTION IN GROUP-BASED COMMUNICATION PLATFORM

(71) Applicant: Slack Technologies, Inc., San Francisco, CA (US)

(72) Inventors: Max Baez, San Francisco, CA (US); Pooja Menta, San Francisco, CA (US); Stephen Michael Hamrick, Redwood City, CA (US)

(73) Assignee: Slack Technologies, Inc., San Francisco, CA (US)

( * ) Notice: Subject to any disclaimer, the term of this patent is extended or adjusted under 35 U.S.C. 154(b) by 0 days.

(21) Appl. No.: 16/948,299

(22) Filed: Sep. 11, 2020

(51) Int. Cl.
*H04L 12/58* (2006.01)
(52) U.S. Cl.
CPC .................... *H04L 51/18* (2013.01)
(58) Field of Classification Search
CPC ....... H04L 51/18; H04L 67/06; H04L 63/104; H04L 63/083; H04L 67/22; H04L 67/306; H04L 63/1425; H04L 67/146; H04L 51/063; H04L 63/08; H04L 51/12; G06F 16/2365; G06F 16/9035; G06F 2221/2101; G06Q 10/107; G06Q 50/01
See application file for complete search history.

(56) References Cited

U.S. PATENT DOCUMENTS

| 2016/0306812 | A1* | 10/2016 | McHenry | G06Q 10/10 |
| 2018/0276223 | A1* | 9/2018 | Dhanasekaran | G06F 16/125 |
| 2018/0287982 | A1 | 10/2018 | Draeger et al. | |

OTHER PUBLICATIONS

David Auerbach, "Re-Animator. How Stewart Butterfield created Flickr and Slack out of the ashes of failed projects" online retrieved May 9, 2019. Retrieved from the Internet: <URL: https://slate.com/business/2014/05/stewart-butterfield-flickr-and-slack-how-he-snatched-victory-from-the-jaws-of-defeat.html> 12 pages. (dated May 28, 2014, 2:48 PM) 8 pages.

Michael Carney, "Slack is thriving on a cocktail of whimsy and great timing", PANDODAILY, LEXISNEXIS, https://advance.lexis.com/api/permalink/dd2d4ee5-2ddf-4d3a-a1d9-3bcee5e38b74/?context=1000516, (dated Feb. 6, 2015, 2:12 AM) 4 pages.

(Continued)

*Primary Examiner* — Soe Hlaing
(74) *Attorney, Agent, or Firm* — Lee & Hayes, P.C.

(57) ABSTRACT

Techniques for modifying a period of time that data, associated with a characteristic, transmitted via a communication platform is retained are described. A data retention rule can include a first period of time for retaining data transmitted via the communication platform, in association with an organization. The first user can additionally establish a specific data retention rule associated with data associated with a particular characteristic. The specific data retention rule can include an instruction to store communications including the particular characteristic for a second time period that is different from the first time period associated with the data retention rule. The communication platform can receive data from a second user computing device associated with the second user of the organization. Based on a determination that the data is associated with the characteristic, the communication platform can store the data according to the data retention rule specified for such data.

20 Claims, 9 Drawing Sheets

(56) References Cited

OTHER PUBLICATIONS

"Die, Email, Die! a Flickr Cofounder Aims to Cut Us All Some Slack", READWRITEWEB, LEXISNEXIS, https://advance.lexis.com/api/permalink/33dd79e2-90f5-409d-ae27-5a2c7e86bf31/?context=1000516>. (dated Aug. 14, 2013, 4:15 PM) 3 pages.
Robert Hof, "Stewart Butterfield on How Slack Became a $2.8 Billion Unicorn", FORBES, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 4 pages.
"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 16 pages.
Matthew Ingram, "Flickr co-founder launches Slack, an all-in-one messaging tool designed to kill email forever", GIGAOM, LEXISNEXIS, https://advance.lexis.com/api/permalink/0b676b7c-aec3-4560-861e-d030didd008c/?context=1000516, (dated Feb. 12, 2014, 7:03 PM), 3 pages.
Internet Relay Chat, WIKIPEDIA, [online][retrieved May 30, 2019]. Retrieved from the Internet: <URL: https://en.wikipedia.org/wiki/Internet_Relay_Chat>. (dated May 28, 2019) 21 pages.
Mike Issac, "Slack, a Start-Up With an App to Foster Business Collaboration, Is Valued at $1.1 Billion", The New York Times Blogs (BITS), LEXISNEXIS, https://advance.lexis.com/api/permalink/3eb84b34-a8f9-4d7d-9573-89d9598a4963/?context=1000516>. (dated Oct. 31, 2014) 3 pages.
Adrienne LaFrance, "The Triumph of Email", Atlantic Online, LEXISNEXIS, https://advance.lexis.com/api/permalink/32d7ddd9-d4c1-4a73-86f7-08ab5842fde6/?context=1000516, (dated Jan. 6, 2016) 6 pages.
Matsumoto, T. et al., "Chocoa Communicator—A New Communication System Based on Awareness and Text Communications", FUJITSU Sci. Tech. J., 36, 2, (Dec. 2000) pp. 154-161.
Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.
Ernie Smith, "Picking up the Slack", TEDIUM, [online][retrieved May 9, 2019]. Retrieved from the Internet: <URL: https://tedium.co/2017/10/17/irc-vs-slack-chat-history/. (dated Oct. 17, 2017) 8 pages.
The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 21 pages.
Jonathan Vanian, "Why these startups think chat apps are the next big thing in workplace collaboration", GIGAOM, LEXISNEXIS, https://advance.lexis.com/api/permalink/e83778c8-09c8-43aa-9ba0-88526283de69/?context=1000516, (dated Aug. 1, 2014, 5:45 PM) 4 pages.
Rebecca Walberg, "Email biggest office waste of time: survey", National Post, At FP10, LEXISNEXIS, https://advance.lexis.com/api/permalink/96268e3f-26ad-48ac-a98f-6c39804ebded/?context=1000516, (dated Mar. 4, 2014) 3 pages.

* cited by examiner

DATA RETENTION IN GROUP-BASED COMMUNICATION PLATFORM

TECHNICAL FIELD

Many organizations and users thereof utilize group-based communication platforms to communicate with other members of an organization of a user and with members of other organizations. The data transmitted via the group-based communication platform, such as in the form of messages, attachments thereto, or the like, may be stored in a database corresponding to an associated organization (e.g., organization associated with the sender or one or more recipients of the message). In some examples, an organization may establish a data retention policy, indicating a particular time period (e.g., six months, one year, etc.) for retaining stored messages in the database. For example, a first organization may establish a data retention policy instructing the group-based communication platform to store messages associated with the first organization for six months. Based on the data retention policy associated with a particular organization, the group-based communication platform may remove messages from the database associated therewith.

BRIEF DESCRIPTION OF THE DRAWINGS

The detailed description is described with reference to the accompanying figures. In the figures, the left-most digit of a reference number identifies the figure in which the reference number first appears. The use of the same reference numbers in different figures indicates similar or identical components or features. The figures are not drawn to scale.

DETAILED DESCRIPTION

Figure 1:
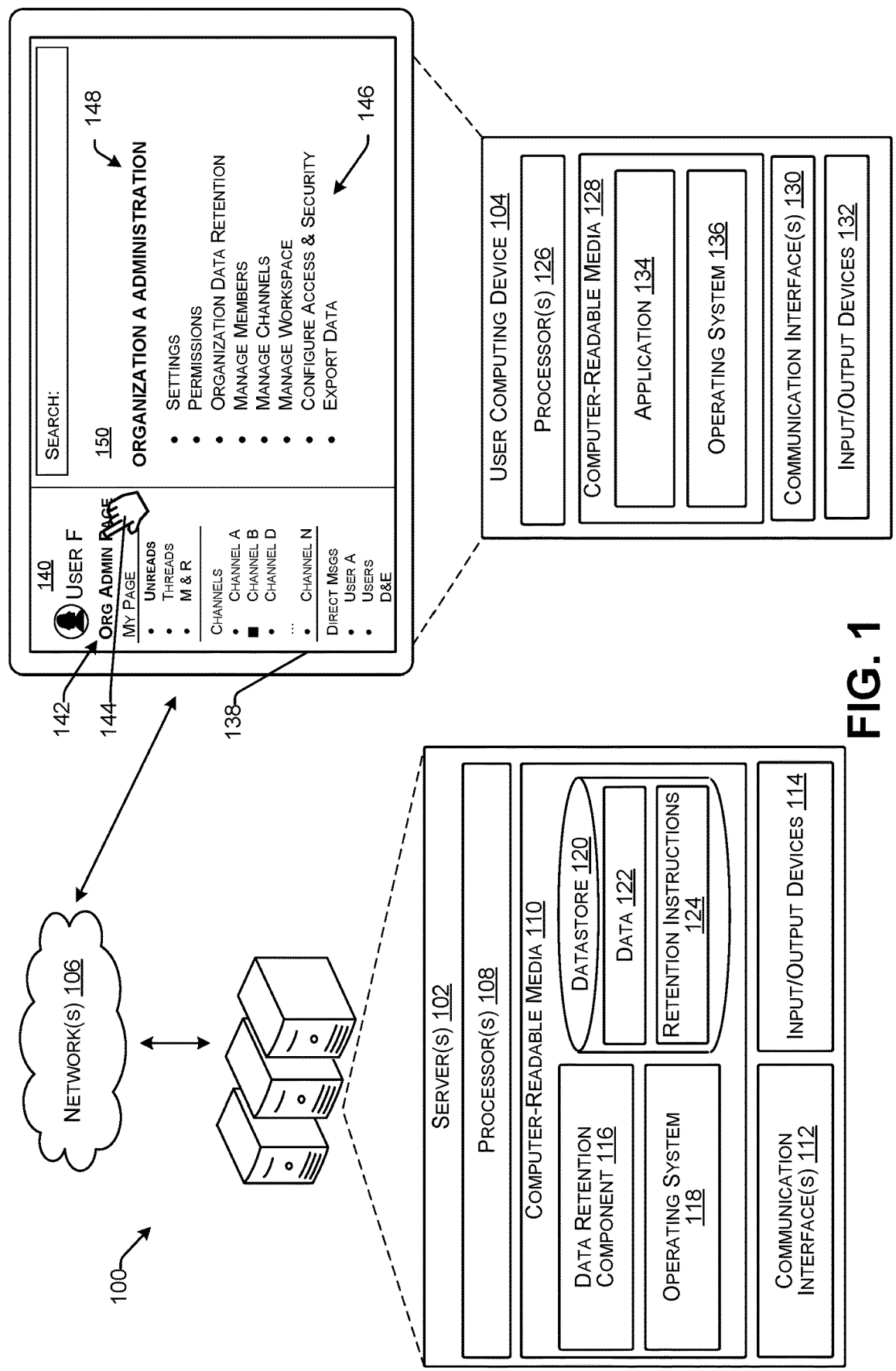
FIG. 1 illustrates an example environment for performing techniques described herein.

Techniques for specifying a data retention rule for data associated with a characteristic that is transmitted via a communication platform are described. The communication platform can be a group-based communication platform, a channel-based messaging platform, and/or any other platform for facilitating communication between and among users. In an example, a user of a first organization can utilize communication services available via the communication platform to communicate with one or more users of the first organization and/or one or more users of a second organization. In some examples, the user can establish a data retention rule (e.g., policy) with regard to the first organization. In such examples, the user can instruct the communication platform to store communications associated with the first organization for a first time period (e.g., one year, two years, etc.).

In some examples, the user can specify a data retention rule (e.g., store in perpetuity, store until a particular date, etc.) associated with communications associated with a particular characteristic (e.g., sent by a particular user, transmitted via a communication channel and/or a workspace, etc.) such that communications associated with the particular characteristic are stored for a second period of time that is different than the first period of time. In such examples, the communication platform can store communications including the particular characteristic for the second time period (e.g., in perpetuity, until a particular date, etc.) instead of the first time period. For example, a data retention rule can include a first instruction to store communications associated with an organization for one year and a specified data retention rule can include a second instruction to store communications associated with a particular user of the organization in perpetuity (e.g., until the specified data retention rule is cancelled). The communication platform can receive a message from a computing device associated with the particular user. Based on a determination that the message is associated with the particular user, the communication platform can store the message in perpetuity based on the specified retention rule. That is, the specified data retention rule can override the data retention rule.

In existing technologies, a communication platform may enable a user of an organization to establish a data retention rule associated with the organization. The data retention rule may designate a particular time period for which the communication platform stores communications associated with the organization. The data retention rule may assist the organization in decreasing a total amount of stored communications (e.g., data) associated with the organization. However, if the organization or a member thereof are subject to legal proceedings (e.g., litigation, administrative hearings, etc.), the data retention rule may violate data retention policies associated with the legal proceedings. Accordingly, an organization (or member thereof) that is or may be subject to legal proceedings may be unable to establish a data retention rule. To ensure that the organization does not violate a data retention policy associated with legal proceedings, the organization may be required to ensure that all communications associated with the organization are stored for a designated period of time, until a particular date, or the like.

Techniques described herein are directed to enabling a user of an organization to establish a data retention rule for communications associated with the organization, such as to delete communications that have been stored for a first period of time, and to specify a different data retention rule for communications including a particular characteristic, such as to store a communication including the particular characteristic for a second period of time. The characteristic can include one or more users (e.g., a first user and/or a second user, a group of users, etc.), one or more communication channels, one or more workspaces, an organization (e.g., communications between a member of the organization and another organization), one or more dates (e.g., a range of dates), a conversation (e.g., messages transmitted within a time frame of one another), a topic (e.g., subject of a conversation, etc.), or the like. That is, in at least one example, the user of the organization can establish a data retention rule and can specify a different data retention rule for communications including a particular characteristic such that the communication platform stores messages not associated with the characteristic per the data retention rule and communications associated with the characteristic per the specified data retention rule.

In various examples, the communication platform can receive a message (e.g., channel-based message, direct message, etc.) from a first client device of a first organization. The communication platform can determine a data retention rule associated with the first organization. The communication platform can also determine whether the message is associated with a characteristic corresponding to a specified data retention rule. Based on a determination that the message is not associated with the characteristic, the communication platform can store the message in a database associated with the first organization based on the data retention rule. Based on a determination that the message is associated with the characteristic, the communication platform can associate an indicator with the message. The indicator may include a flag or other type of indicator to signal a message is subject to a specified data retention rule. The communication platform may store the message with the indicator in the database associated with the organization based on the specified data retention rule (e.g., store for a second period of time that is different from a first period of time associated with a data retention rule).

In various examples, the communication platform can manage the database associated with the organization. In some examples, the communication platform can determine dates associated with messages (e.g., based on a timestamp associated therewith, etc.) stored in the database. The communication platform may identify one or more messages including a date that exceeds the time period corresponding to the data retention rule. In at least one example, the communication platform can identify a first message of the one or more messages that includes the indicator. In such an example, the communication platform can retain the first message based on the specified data retention rule and can delete or otherwise purge other messages including the date that exceeds the time period from the database based on the data retention rule. In other words, the specified data retention rule overrides the data retention rule associated with the organization such that the first message that includes the characteristic is retained in the database while other messages are deleted based on the data retention rule.

In various examples, the communication platform may receive, from a user associated with an organization, a request to view data associated with the organization. The request can include a request to view data associated with a communication channel, a workspace, a direct messaging instance, or the like. In some examples, the communication platform can determine that a first message stored based on the specified data retention rule has a date associated therewith that is beyond a date range associated with the data retention rule. For example, the data retention rule may include an instruction to store communications for one year and the message stored based on the specified data retention rule may have an associated date 13 months in the past (e.g., one month beyond the data retention rule). In such examples, the communication platform may cause the message to be withheld from content presented to the user based on the request. That is, the message may not be viewable to the user even though it is stored in association with the organization.

In various examples, the communication platform may receive, from a computing device associated with an administrator (e.g., administrator account, etc.) of an organization, a request to export data associated with a particular specified data retention rule. In such an example, the communication platform can identify one or more messages including an indicator associated with the particular specified data retention rule and can cause the one or more messages to be rendered on a display of the computing device associated with the administrator. For example, the administrator may request, at a first time, that data associated with a particular user be retained according to a specified data retention rule. Based on the request, the communication platform may store data associated with the particular user in a database according to the specified data retention rule. At a second time after the first time, the administrator may request to export or otherwise view the data associated with the particular user. Based on the request to export or otherwise view the data, the communication platform may cause the stored data associated with the particular user to be presented on a computing device associated with the administrator.

In various examples, the request to retain data based on a specified data retention rule may include a particular end date and/or a date range associated therewith. In such examples, the communication platform may automatically store the data per the specified data retention rule until a current date corresponds to the particular end date and/or is not within the date range. In some examples the request to retain data based on a specified data retention rule may not include an end date. In such examples, the communication platform may continue to store the data associated with an organization per the specified data retention rule until the communication platform receives a request to terminate the specified data retention rule. Responsive to receiving the request to terminate the specified data retention rule, the communication platform may store data according to a data retention rule associated with the organization. For example, a specified data retention rule may include an instruction to store data associated with a particular user of an organization in perpetuity. The communication platform may receive data associated with the particular user and may store the data in a database, such as beyond a time associated with a data retention rule of the organization. At a later time, the communication platform may receive a request to terminate the specified data retention rule associated with the particular user. Based on the request to terminate the specified data retention rule, the communication platform may store the data associated with the particular user according to the data retention rule of the organization.

Techniques described herein decrease a total amount of data stored in a database associated with an organization, thereby improving the functioning of a server computing device associated with a group-based communication platform. As discussed above, existing technologies may require that organizations that are or may be subject to legal proceedings store any communications transmitted via the communication platform, regardless of the users associated with the communications. For example, using an existing system, an organization involved in or that anticipates potentially being involved in litigation may be required to store all communications associated with all employees, regardless of whether the employees may have a nexus to the litigation or the potential future litigation. This can require a significant amount of storage space and processing power to manage the data stored in the database.

Unlike the existing technologies, the techniques described herein enable an organization to designate a data retention rule, such as to reduce a total amount of stored data associated therewith, while also establishing a specified data retention rule associated with particular users, channels, workspaces, etc., such that data associated with the particular users, channels, workspaces, etc. is stored (potentially) longer than other data stored based on the data retention rule. Because the techniques described herein enable any organization, even those that are subject or that may be subject to legal proceedings, to designate a data retention rule, the techniques described herein reduce a total amount of data stored in association with an organization, while also enabling the organization to remain in compliance with one or more data retention policies associated with litigation or another storage request. As such, the techniques described herein may improve the functioning of a server computing device by reducing an amount of memory and processing power required to manage the data stored in the memory.

While the description above describes retaining data associated with a particular characteristic beyond a time associated with a data retention rule, techniques described herein can similarly be applicable to other methods of communication, such as electronic mail (email), short message service messaging, and the like. For example, an email service provider may establish a data retention rule to store emails transmitted via the email service provider for 5 years. The email service provider may additionally include a specified data retention rule associated with starred or emails otherwise marked for retention. The email service provider may receive a starred message (or an instruction to star the message) from a user computing device and may store the starred message according to the specified data retention rule (e.g., with an indicator to not delete the email message). The email service provider may thus retain the message in a database based on the specified data retention rule until the rule is removed and/or the user removes the star from the email message. As such, techniques described herein are not limited to group-based communication platforms. Additional details and examples are described below with reference to FIGS. 1-8.

FIG. 1 illustrates an example environment 100 for performing techniques described herein. In at least one example, the example environment 100 can be associated with a communication platform that can leverage a network-based computing system to enable users of the communication platform to exchange data. In at least one example, the communication platform can be "group-based" such that the platform, and associated systems, communication channels, messages, and/or virtual spaces, have security (that can be defined by permissions) to limit access to a defined group of users. In some examples, such groups of users can be defined by group identifiers, as described above, which can be associated with common access credentials, domains, or the like. In some examples, the communication platform can be a hub, offering a secure and private virtual space to enable users to chat, meet, call, collaborate, transfer files or other data, or otherwise communicate between or among each other. As described above, each group can be associated with a workspace, enabling users associated with the group to chat, meet, call, collaborate, transfer files or other data, or otherwise communicate between or among each other in a secure and private virtual space. In some examples, members of a group, and thus workspace, can be associated with a same organization. In some examples, members of a group, and thus workspace, can be associated with different organizations (e.g., entities with different organization identifiers).

In at least one example, the example environment 100 can include one or more server computing devices (or "server (s)") 102. In at least one example, the server(s) 102 can include one or more servers or other types of computing devices that can be embodied in any number of ways. For example, in the example of a server, the functional components and data can be implemented on a single server, a cluster of servers, a server farm or data center, a cloud-hosted computing service, a cloud-hosted storage service, and so forth, although other computer architectures can additionally or alternatively be used.

In at least one example, the server(s) 102 can communicate with a user computing device 104 via one or more network(s) 106. That is, the server(s) 102 and the user computing device 104 can transmit, receive, and/or store data (e.g., content, information, or the like) using the network(s) 106, as described herein. The user computing device 104 can be any suitable type of computing device, e.g., portable, semi-portable, semi-stationary, or stationary. Some examples of the user computing device 104 can include a tablet computing device, a smart phone, a mobile communication device, a laptop, a netbook, a desktop computing device, a terminal computing device, a wearable computing device, an augmented reality device, an Internet of Things (TOT) device, or any other computing device capable of sending communications and performing the functions according to the techniques described herein. While a single user computing device 104 is shown, in practice, the example environment 100 can include multiple (e.g., tens of, hundreds of, thousands of, millions of) user computing devices. In at least one example, user computing devices, such as the user computing device 104, can be operable by users to, among other things, access communication services via the communication platform. A user can be an individual, a group of individuals, an employer, an enterprise, an organization, or the like.

The network(s) 106 can include, but are not limited to, any type of network known in the art, such as a local area network or a wide area network, the Internet, a wireless network, a cellular network, a local wireless network, Wi-Fi and/or close-range wireless communications, Bluetooth®, Bluetooth Low Energy (BLE), Near Field Communication (NFC), a wired network, or any other such network, or any combination thereof. Components used for such communications can depend at least in part upon the type of network, the environment selected, or both. Protocols for communicating over such network(s) 106 are well known and are not discussed herein in detail.

In at least one example, the server(s) 102 can include one or more processors 108, computer-readable media 110, one or more communication interfaces 112, and input/output devices 114.

In at least one example, each processor of the processor(s) 108 can be a single processing unit or multiple processing units and can include single or multiple computing units or multiple processing cores. The processor(s) 108 can be implemented as one or more microprocessors, microcomputers, microcontrollers, digital signal processors, central processing units (CPUs), graphics processing units (GPUs), state machines, logic circuitries, and/or any devices that manipulate signals based on operational instructions. For example, the processor(s) 108 can be one or more hardware processors and/or logic circuits of any suitable type specifically programmed or configured to execute the algorithms and processes described herein. The processor(s) 108 can be configured to fetch and execute computer-readable instructions stored in the computer-readable media, which can program the processor(s) to perform the functions described herein.

The computer-readable media 110 can include volatile and nonvolatile memory and/or removable and non-removable media implemented in any type of technology for storage of data, such as computer-readable instructions, data structures, program modules, or other data. Such computer-readable media 110 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired data and that can be accessed by a computing device. Depending on the configuration of the server(s) 102, the computer-readable media 110 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 110 can be used to store any number of functional components that are executable by the processor(s) 108. In many implementations, these functional components comprise instructions or programs that are executable by the processor(s) 108 and that, when executed, specifically configure the processor(s) 108 to perform the actions attributed above to the server(s) 102. Functional components stored in the computer-readable media can optionally include a data retention component 116, an operating system 118, and a datastore 120 (e.g., database).

In various examples, the data retention component 116 can be configured to receive a request from a user computing device 104 to establish a data retention rule (e.g., retention rule) with regard to an organization associated with the user computing device 104. In some examples, the user computing device 104 may include a computing device associated with an administrative account of the organization. In such examples, the administrative account may be associated with an administrator responsible for managing user accounts, communication channels, workspaces, or the like. In some examples, administrator may manage settings, permissions, workspace design, access, security, data storage, data access, and other functions associated with communications via the communication platform. In various examples, the administrator can be a user having a particular role within an organization (e.g., owner, administrator, etc.)

In various examples, the data retention rule may include a retention period for storing data associated with an organization. The retention period can include a time period (e.g., five months, 10 months, 1 year, 2 years, etc.), a designated date (e.g., store data associated with the organization until a future date), a specified event (e.g., an action that takes place with regard to the communication platform, organization, etc.), or the like. In at least one example, the retention period can include a time period designating an amount of time that data 122 associated with the organization and transmitted via the communication platform will be stored in the datastore 120. For example, a data retention rule for a first organization can cause data 122 associated therewith to be stored for one year from when the data 122 is transmitted via the communication platform. The server 102 may receive, from a user computing device 104, a first message associated with a first time. The server 102 may determine that a current (second) time is one year and one day after the first time. Responsive to determining that the first time associated with the first message exceeds the time period associated with the data retention rule, the server 102 may automatically delete the first message from the datastore 120.

In some examples, the data retention component 116 may include a default data retention rule. In such examples, based on a determination that the data retention component 116 does not receive the request from the user computing device 104 to establish the data retention rule associated with the organization, the data retention component 116 may associate the default data retention rule with the organization. Accordingly, the data 122 associated with the organization may be stored based on the default data retention rule. In some examples, the default data retention rule may include a pre-determined period of time (e.g., 5 years, 10 years, etc.). In some examples, the default data retention rule may include a determination to store the data 122 associated with the organization in perpetuity.

In some examples, the data retention component 116 may receive, from the user computing device 104, a request to establish another data retention rule associated with an organization. In some examples, the user computing device 104 may be a computing device associated with an administrative account of an organization. In such examples, an administrator may submit the request to establish the other data retention rule via the administrative account.

In some examples, the other data retention rule can be associated with a retention of data 122 including one or more characteristics. The data 122 can include messages sent via the communication platform. Additionally, the data 122 can include files, emojis, animated emojis, reactjis, and/or edits (e.g., adding or otherwise modifying data associated with the message, deleting a portion of the message, etc.) associated with the messages. The characteristic(s) can include one or more users (e.g., a first user and/or a second user, a group of users, etc.), one or more communication channels, one or more workspaces, an organization, one or more dates (e.g., a range of dates), a conversation (e.g., messages transmitted within a time frame of one another), a topic (e.g., subject of a conversation, etc.), or the like. For example, a specified data retention rule (e.g., specified retention rule) can include an instruction to retain data 122 associated with a particular user. For another example, a specified data retention rule can include an instruction to retain data 122 associated with one or more communication channels. For yet another example, the specified data retention rule can include an instruction to retain data 122 associated with a workspace. For a further example, the specified data retention rule can include an instruction to retain data 122 associated with a particular topic, key word, phrase, or the like.

In various examples, the data retention component 116 may receive, from the user computing device 104, a second request to exclude data 122 associated with another characteristic from the specified data retention rule. In such examples, data 122 associated with the other characteristic may be stored per the data retention rule associated with the organization, regardless of an association with the characteristic(s) of the specified data retention rule. For example, an administrator may submit a request to store data 122 (e.g., messages and data associated therewith) associated with a particular user that is transmitted via the communication platform. The request may include a request to exclude a communication channel associated with the organization entitled "Silly-Animal-Memes." The data retention component 116 may thus store data 122 associated with the particular user transmitted via communication channels, direct messaging instances, and/or workspaces according to the specified data retention rule and data 122 associated with the "Silly-Animal-Memes" communication channel according to the data retention rule of the organization.

In various examples, the data retention component 116 may generate an instruction to associate an indicator (e.g., a flag, a binary code, etc.) with the data 122 corresponding to the characteristic. In some examples, the instruction to associate the indicator with the data 122 may be stored as retention instructions 124 in the datastore 120. The indicator may provide an indication to not delete the data 122 associated with the characteristic per the data retention rule. For example, the data retention component 116 may receive a message from a user associated with an organization and corresponding to a specified data retention rule. The data retention component 116 may associate an indicator with the message, the indicator providing an indication to retain the message in the datastore 120 beyond a period associated with a data retention rule of the organization.

In some examples, the request to specify a data retention rule associated with the one or more characteristics may include a particular time period (e.g., date range) for storage of data associated with the characteristic(s). In such examples, the instruction may include an instruction to associate the indicator with data 122 associated with the characteristic(s) transmitted or received during the particular time period. In various examples, the data retention component 116 can automatically delete the instruction to associate the indicator with the data 122 corresponding to the characteristic based on a determination that a current time is after the designated time period (e.g. after the particular time period associated with a specified data retention rule). In such examples, the data retention component 116 may delete the instruction to associate the indicator with the data 122 including the characteristic(s) from the database 120 (e.g., retention instructions 124) after the time period associated therewith has passed. For example, the request to retain data associated with a characteristic for a time period from a current time (e.g., present) to Jun. 22, 2022 (e.g., previously received or received between the current time until Jun. 22, 2022). Based on the time period, the data retention component 116 generates an instruction to associate the indicator with the data 122 corresponding to the characteristic until Jun. 22, 2022. The data retention component 116 may automatically terminate the instruction to associate the indicator with the data 122 from the characteristic on Jun. 23, 2022. Accordingly, after the time period, the data retention component 116 may store the data 122 associated with the characteristic based on a data retention rule.

In some examples the request to specify the data retention rule associated with the characteristic(s) may not include an end date. In such examples, the data retention component 116 may continue to store the data 122 associated with the characteristic(s) per the specified data retention rule until the data retention component 116 receives a request to terminate the specified data retention rule. Responsive to receiving the request to terminate the specified data retention rule, the data retention component 116 may store data 122 according to a data retention rule associated with the organization. For example, a specified data retention rule may include an instruction to store data 122 associated with a particular user of an organization in perpetuity. The data retention component 116 may receive data 122 associated with the particular user and may store the data 122 in the datastore 120, such as beyond a time associated with a data retention rule of the organization. At a later time, the data retention component 116 may receive a request to terminate the specified data retention rule. Based on the request to terminate the specified data retention rule, the data retention component 116 may store the data 122 according to the data retention rule of the organization.

In various examples, the data retention component 116 may be configured to delete or otherwise purge data 122 associated with an organization that is stored in the datastore 120 per the data retention rule and/or specified data retention rule associated with the organization. In some examples, the data retention component 116 may delete or otherwise purge the data 122 periodically (e.g., once per day, twice per day, once per week, etc.). In some examples, the data retention component 116 may delete or otherwise purge the data 122 intermittently and/or when instructed by an administrator of the organization.

In various examples, the data retention component 116 may determine to delete or otherwise purge the data 122 associated with the organization at a time. The data retention component 116 can identify one or more messages and associated data (e.g., files, emojis, reactjis, animated emojis, edits, etc.) with a corresponding date (e.g., timestamp, date sent, etc.) that exceeds the data retention rule associated with the organization. In at least one example, the data retention component 116 can identify a first message of the one or more messages that includes the indicator (e.g., is associated with a characteristic associated with a specified data retention rule). In such an example, the data retention component 116 can retain the first message based on the specified data retention rule and can delete or otherwise purge other messages including the date that exceeds the time period from the datastore 120 based on the data retention rule. As such, the specified data retention rule can override the data retention rule associated with the organization such that the first message that includes the indicator is retained in the database while other messages are deleted based on the data retention rule.

In various examples, the data retention component 116 can receive a request, from a user computing device 104, to view data 122 associated with an organization. The request can include a request to view data 122 associated with a communication channel, a workspace, a direct messaging instance, or the like. In some examples, the request can include a request to view data 122 associated with a conversation. In such examples, the conversation can be associated with a communication channel, a workspace, a direct messaging instance, or the like. For example, a user associated with the user computing device 104 may scroll through a communication channel to view old messages (and associated data) associated with the communication channel. In various examples, the data retention component 116 can determine that a message corresponding to the communication channel and including the indicator (e.g., a characteristic associated with a specified data retention rule) is stored in the datastore 120. The data retention component 116 can determine that a date associated with the message (e.g., timestamp, date sent, etc.) is not within a time period associated with a data retention rule of the organization.

Based on the determination that the date associated with the message is not within the time period associated with the data retention rule, the data retention component 116 can determine to not cause the message to be rendered for viewing to the requesting user. In other words, the data retention component 116 can cause one or more other messages with dates within the data retention rule to be rendered for viewing but can prevent the message from being viewed by the requesting user. Continuing the example from above, the user of an organization may scroll through the communication channel to view messages in the communication channel. The organization may have associated therewith a data retention rule to store messages (and associated data) for one year. As the user scrolls back through the communication channel to view older and older messages, the data retention component 116 can cause messages that are less than one year old to be rendered for display to the user. The data retention component 116 can identify a message including an indicator that is greater than one year old (e.g., retained based on a specified data retention rule). Based on the indicator and/or the determination that the date associated with the message exceeds the data retention rule, the data retention component 116 can withhold the message from being rendered for display to the user.

In various examples, the data retention component 116 can receive a request to export data 122 associated with one or more characteristics corresponding to a specified data retention rule. In various examples, the request to export data 122 may be received from a user computing device 104 associated with the administrator and/or owner of the organization. In some examples, responsive to receiving the request to export data 122, the data retention component 116 can identify one or more messages including an indicator associated with the specified data retention rule (e.g., associated with the characteristic). The data retention component 116 can cause the one or more messages to be rendered on a display of the user computing device 104 associated with the administrator and/or owner of the organization. For example, an administrator may request, at a first time, that data associated with a particular user be retained according to a specified data retention rule. Based on the request, the data retention component 116 may store data 122 associated with the particular user in the datastore 120 according to the specified data retention rule. At a second time after the first time, the administrator may request to export or otherwise view the data 122 associated with the particular user (e.g., the specified data retention rule). Based on the request to export or otherwise view the data, the data retention component 116 may cause the stored data 122 associated with the particular user to be presented on the user computing device 104 associated with the administrator.

In some examples, the administrator may be an administrator of a first organization that is associated with a shared channel between the first organization and a second organization (or one or more other organizations). In some examples, the first organization may include a same data retention rule as the second (or other) organization. In some examples, the first organization may include a different data retention rule from the second (or other) organization. In such examples, the data retention component 116 may store data 122 associated with the first organization for a first period of time associated with the first data retention rule and data associated with the second organization for a second (different) period of time associated with a second data retention rule. In various examples, data 122 stored based on disparate data retention rules may be visible to members of one organization but not the other organization. For example, a first organization may include a first data retention rule to store communications for one year and a second organization may include a second data retention rule to store communications for five years. The data retention component 116 may store a message, transmitted via a shared channel between the first organization and the second organization, in a first database (or database shard) associated with the first organization and the second organization. In some examples, the data retention component 116 can determine that a time associated with the message is over the one year time period associated with the first data retention policy, and can delete the message from the first database (or database shard) associated with the first organization, while maintaining the message in a second database (or database shard) associated with the second organization. In some examples, the data retention component 116 can determine that the message includes an indicator corresponding to a specified data retention rule of the first organization. Based on a determination that the message includes the indicator corresponding to a specified data retention rule of the first organization, the data retention component 116 retains the message in the first database per the specified data retention rule and the second database per the second data retention rule.

The data retention component 116 may receive, from a first user computing device 104 associated with the first organization, a request to view the message after the one year time period associated with the first data retention rule. The data retention component 116 may determine that the message is either deleted or, in some examples, is subject to a specified data retention policy, and may withhold the message from viewing to the member of the first organization. On the other hand, the data retention component 116 may receive, from a second user computing device 104 associated with the second organization, a request to view the message after the one year time period associated with the first data retention rule and before the five-year time period associated with the second data retention rule. The data retention component may determine that the message is eligible for viewing by a member of the second organization and may cause the message to be presented via a display of the second computing device.

In at least one example, the first organization may have associated therewith a specified data retention rule that is not associated the second (or other) organization. In various examples, the data retention component 116 can store communications associated with a shared communication channel based on data retention rules and/or specified data retention rules associated with the different organizations. As discussed above, an administrator of a first organization may request to view data associated with a specified data retention rule corresponding to the first organization. In some examples, the data retention component 116 may identify one or more messages corresponding to the specified data retention rule, for presentation to the administrator. In some examples, communications transmitted by members of two or more organizations may be identified and/or presented to the administrator. In such examples, the identified communications may satisfy the data retention policies of each organization. In some examples, communications from the administrator's organization may be identified and/or presented to the administrator. In such examples, the data retention component 116 may determine that the communications do not satisfy the data retention policy associated with another organization and/or that the communications have been deleted or otherwise purged from a database associated with the other organization.

In examples in which communications are transmitted via a shared communication channel between two disparate organizations, and depending on data retention rules, permissions, and the like, the data retention component 116 may identify messages transmitted from a member of the administrators organization In some examples, the datastore 120 can be partitioned into discrete items of data that can be accessed and managed individually (e.g., data shards). Data shards can simplify many technical tasks, such as data retention, unfurling (e.g., detecting that message contents include a link, crawling the link's metadata, and determining a uniform summary of the metadata), and integration settings. In some examples, data shards can be associated with organizations, groups (e.g., workspaces), communication channels, users, or the like.

In some examples, the data 122 and/or retention instructions 124 can include discrete shards for each individual organization, including data related to a particular organization identification. For example, a database shard can store electronic communication data associated with members of a particular organization, which enables members of that particular organization to communicate and exchange data with other members of the same organization in real time or near-real time. In this example, the organization itself can be the owner of the database shard and has control over where and how the related data is stored. In some examples, a database shard can store data related to two or more organizations (e.g., as in a shared channel).

In at least one example, the operating system 118 can manage the processor(s) 108, computer-readable media 110, hardware, software, etc. of the server(s) 102.

The communication interface(s) 112 can include one or more interfaces and hardware components for enabling communication with various other devices (e.g., the user computing device 104), such as over the network(s) 106 or directly. In some examples, the communication interface(s) 112 can facilitate communication via Web sockets, Application Programming Interfaces (APIs) (e.g., using API calls), HyperText Transfer Protocols (HTTPs), etc.

The server(s) 102 can further be equipped with various input/output devices 114 (e.g., I/O devices). Such I/O devices 114 can include a display, various user interface controls (e.g., buttons, joystick, keyboard, mouse, touch screen, etc.), audio speakers, connection ports and so forth.

In at least one example, the user computing device 104 can include one or more processors 126, computer-readable media 128, one or more communication interfaces 130, and input/output devices 132.

In at least one example, each processor of the processor(s) 126 can be a single processing unit or multiple processing units, and can include single or multiple computing units or multiple processing cores. The processor(s) 126 can comprise any of the types of processors described above with reference to the processor(s) 108 and can be the same as or different than the processor(s) 108.

The computer-readable media 128 can comprise any of the types of computer-readable media 128 described above with reference to the computer-readable media 110 and can be the same as or different than the computer-readable media 110. Functional components stored in the computer-readable media can optionally include at least one application 134 and an operating system 136.

In at least one example, the application 134 can be a mobile application, a web application, or a desktop application, which can be provided by the communication platform or which can be an otherwise dedicated application. In some examples, individual user computing devices associated with the environment 100 can have an instance or versioned instance of the application 134, which can be downloaded from an application store, accessible via the Internet, or otherwise executable by the processor(s) 126 to perform operations as described herein. That is, the application 134 can be an access point, enabling the user computing device 104 to interact with the server(s) 102 to access and/or use communication services available via the communication platform. In at least one example, the application 134 can facilitate the exchange of data between and among various other user computing devices, for example via the server(s) 102. In at least one example, the application 134 can present user interfaces, as described herein. In at least one example, a user can interact with the user interfaces via touch input, keyboard input, mouse input, spoken input, or any other type of input. In some examples, user interfaces, as described herein, and/or other operations can be performed via a web browser or other access mechanism.

A non-limiting example of a user interface 138 is shown in FIG. 1. As illustrated in FIG. 1, the user interface 138 can present data associated with one or more communication channels, one or more direct messaging instances, one or more organization administration functions, and in some examples, one or more workspaces. That is, in some examples, the user interface 138 can integrate data from multiple workspaces and associated with multiple functionalities of the application 134 into a single user interface so that the user (e.g., of the user computing device 104) can access and/or interact with data associated with the communication platform. In some examples, the user interface 138 can include a first region 140, or pane, that includes indicator(s) (e.g., user interface element(s) or object(s)) associated with communication channels, direct messaging instances, and/or workspace(s) with which the user (e.g., account of the user) is associated. In some examples, the first region 140 may additionally include an organization administration indicator 142 associated with an organization. In such examples, the organization administration indicator 142 may enable an owner or administrator 144 to perform one or more administrative functions 146 associated with a group-based communication account of an organization.

In various examples, responsive to receiving an indication of selection of the organization administration indicator 142, the application 134 and/or server 102 may cause an organization administration page 148 to surface in a second region 150, or pane. The organization administration page 148 may include one or more administrative functions 146 associated with managing a group-based communication account of an organization. In various examples, the organization administration page 148 may be available to an owner or administrator 144 of the group-based communication account of the organization. In such examples, other instances of the application 134 and/or user interface 138 associated with the organization may not include the organization administration page 148 and/or the organization administration indicator 142.

As illustrated in FIG. 1, the organization administration page 148 may include one or more administrative functions 146. The administrative functions 146 may include settings, permissions, organization data retention, management of members, channels, workspaces, configuring access and security, and exporting data associated with the group-based communication account of the organization. As a non-limiting example, the settings and permissions may include managing how users join the account, managing shared channel permissions, establishing organizational policies, setting channel management tools and/or preferences, defining one or more default settings (e.g., do not disturb hours, channels for new users, languages of a workspace or organization, etc.), or the like. As a non-limiting example, management of members, channels, and workspaces may include customizations (e.g., user profiles, workspaces, display names, managing duplicate users, channels, etc.), inviting new users to a workspace, deactivate or reactivate a user account, or the like. As a non-limiting example, a configuration of access and security may include setting default sign-ins for users, user authentication, guest invitation permissions, reset of single sign-on sessions, modifying a single sign-on provider, establishing security and data policies for shared channels, direct messaging instances, and/or workspaces, and the like.

As shown in FIG. 1, the administrative functions 146 may include organization data retention and exporting data. In some examples, the organization data retention may enable the administrator 144 to set a data retention rule for the organization. In some examples, the organization data retention rule may include a default setting for data retention associated with an organization. In some examples, the data retention default setting may include storing data 122 associated with the organization in perpetuity. In such an example, the messages and data associated therewith (e.g., files, emojis, reactjis, animated emojis, etc.) may be stored in the datastore 120 for as long as the organizational account exists (and/or forever) and/or unless otherwise deleted or purged, such as via an administrative function 146. In some examples, the default setting may include storing data for a period of time (e.g., 4 years, 7 years, etc.).

As will be discussed in greater detail below with regard to FIGS. 2A and 2B, the administrative function 146 associated with organization data retention may enable the administrator 144 to specify a time period to retain data associated with one or more characteristics, the time period being different from another time period associated with the data retention rule for the organization. In such examples, the administrator 144 may submit a request to override the data retention rule with respect to the characteristic(s) with a specified data retention rule via the administrative function 146 associated with organization data retention. As described above, the request may include a request to retain data associated with a first characteristic and/or a request to exclude data associated with a second characteristic from the specified data retention rule. For example, the request may include a request to retain data associated with a user for all communications associated with a user except communications sent via a particular communication channel and a particular direct messaging instance.

As shown in FIG. 1, the administrative functions 146 may include exporting data. In some examples, the administrative function 146 associated with exporting data can enable the administrator 144 to export data associated with one or more specified data retention rules. Responsive to receiving a request to export data associated with a specified data retention rule, the data retention component 116 may identify one or more communications (e.g., messages, data associated therewith, etc.) associated with the specified data retention rule and may send a report including the one or more communications to the user computing device 104 associated with the administrator 144.

Additionally or alternatively, the user interface 138 can present data associated with one or more communication channels, one or more threads associated therewith, one or more direct messages, and/or one or more workspaces in the second region 150 and/or a third region (not illustrated). That is, in some examples, the user interface 138 can present messages sent via one or more communication channels and/or via direct message(s) in a single user interface so that the user (e.g., of the user computing device 104) can access and/or interact with data associated with the multiple channels, direct messaging instances, and/or workspaces that he or she is associated with and/or otherwise communicate with other users associated with the multiple channels, direct messaging instances and/or workspaces. The communication channels, direct messaging instances, and/or workspaces can be internal to an organization of the user or externally shared (e.g., include users from two or more organizations).

A communication channel can be "public," which may allow any user within an organization (e.g., associated with an organization identifier to join and participate in the data sharing through the communication channel, or a communication channel may be "private," which may restrict data communication channel to certain users or users having particular roles (e.g., managers, administrators, etc.). In some examples, a communication channel may be "shared," which may allow users associated with different organizations (e.g., entities associated with different organization identifiers) to join and participate in the data sharing through the communication channel. Shared channels may be public, such that they are accessible to any user of either organization, or they may be private, such that they are restricted to access by certain users or users having particular roles from both organizations.

In various examples, the user interface 138 can present the messages in the second region 150, such as in a messaging page. In some examples, the messaging page may be presented in lieu of the organization administration page 148. The messaging page can be associated with a data feed (or, "feed") indicating messages posted to and/or actions taken with respect to one or more communication channels and/or other virtual spaces for facilitating communications (e.g., a virtual space associated with direct message communication (s), a virtual space associated with event(s) and/or action(s), etc.), or the like. In various examples, the messaging page may enable a user to compose, send, receive, and/or view messages and data associated therewith. In at least one example, the data retention component 116 of the server(s) 102 may receive a message composed and sent via a messaging page associated with the application 134. The data retention component 116 can determine that the message is associated with a characteristic corresponding to a specified data retention rule. The data retention component 116 can thus associate an indicator with the message and store the message in the datastore 120 according to the specified data retention rule.

In at least one example, the operating system 136 can manage the processor(s) 126, computer-readable media 128, hardware, software, etc. of the server(s) 102.

The communication interface(s) 130 can include one or more interfaces and hardware components for enabling communication with various other devices (e.g., the user computing device 104), such as over the network(s) 106 or directly. In some examples, the communication interface(s) 130 can facilitate communication via Websockets, APIs (e.g., using API calls), HTTPs, etc.

The user computing device 104 can further be equipped with various input/output devices 132 (e.g., I/O devices). Such I/O devices 132 can include a display, various user interface controls (e.g., buttons, joystick, keyboard, mouse, touch screen, etc.), audio speakers, connection ports and so forth.

While techniques described herein are described as being performed by the data retention component 116, and the application 134, techniques described herein can be performed by any other component, or combination of components, which can be associated with the server(s) 102, the user computing device 104, or a combination thereof.

Figure 2A:
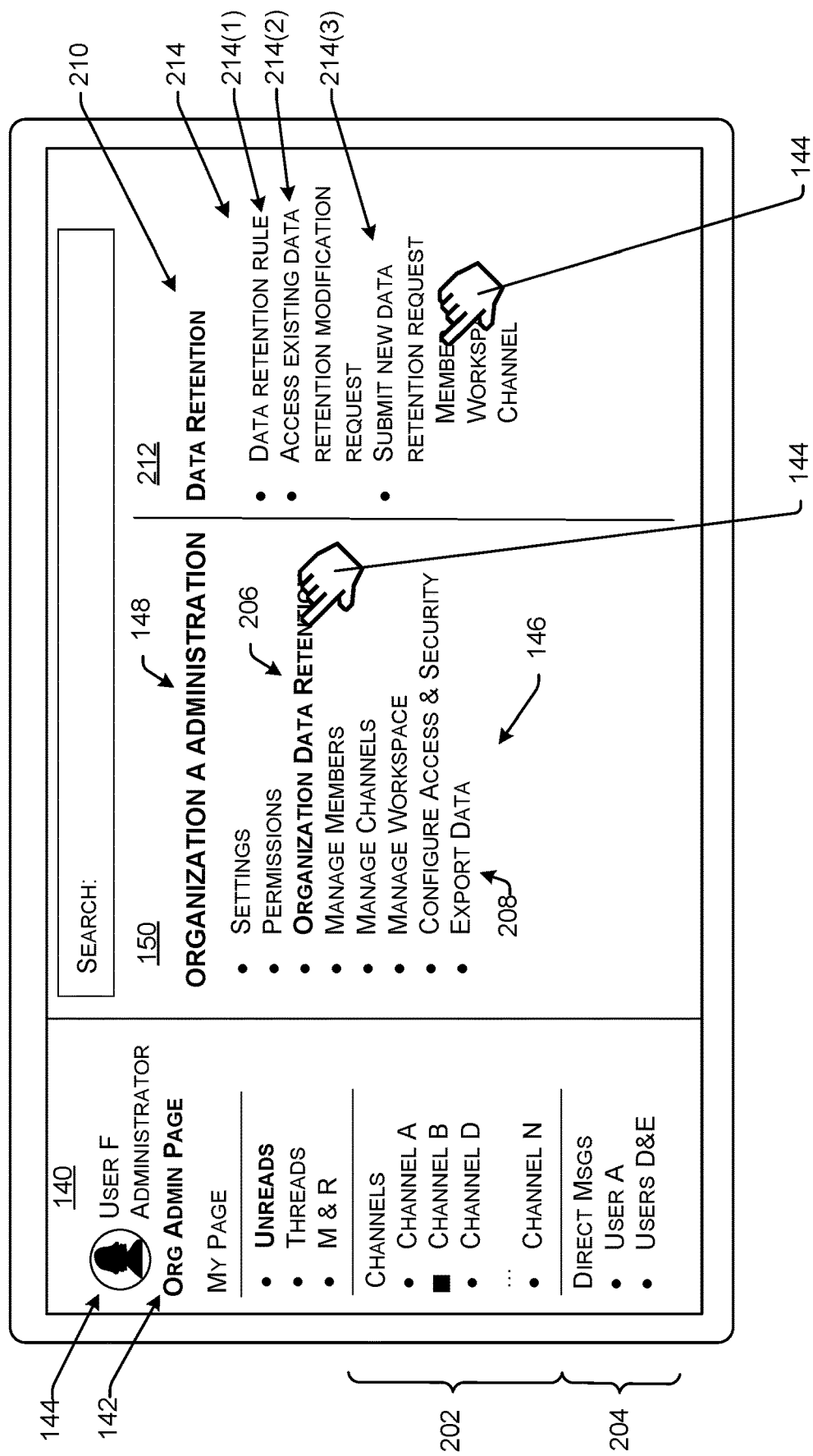
FIGS. 2A and 2B illustrate an example user interface for modifying a time period associated with storing data that includes a particular characteristic, as described herein.
Figure 2B:
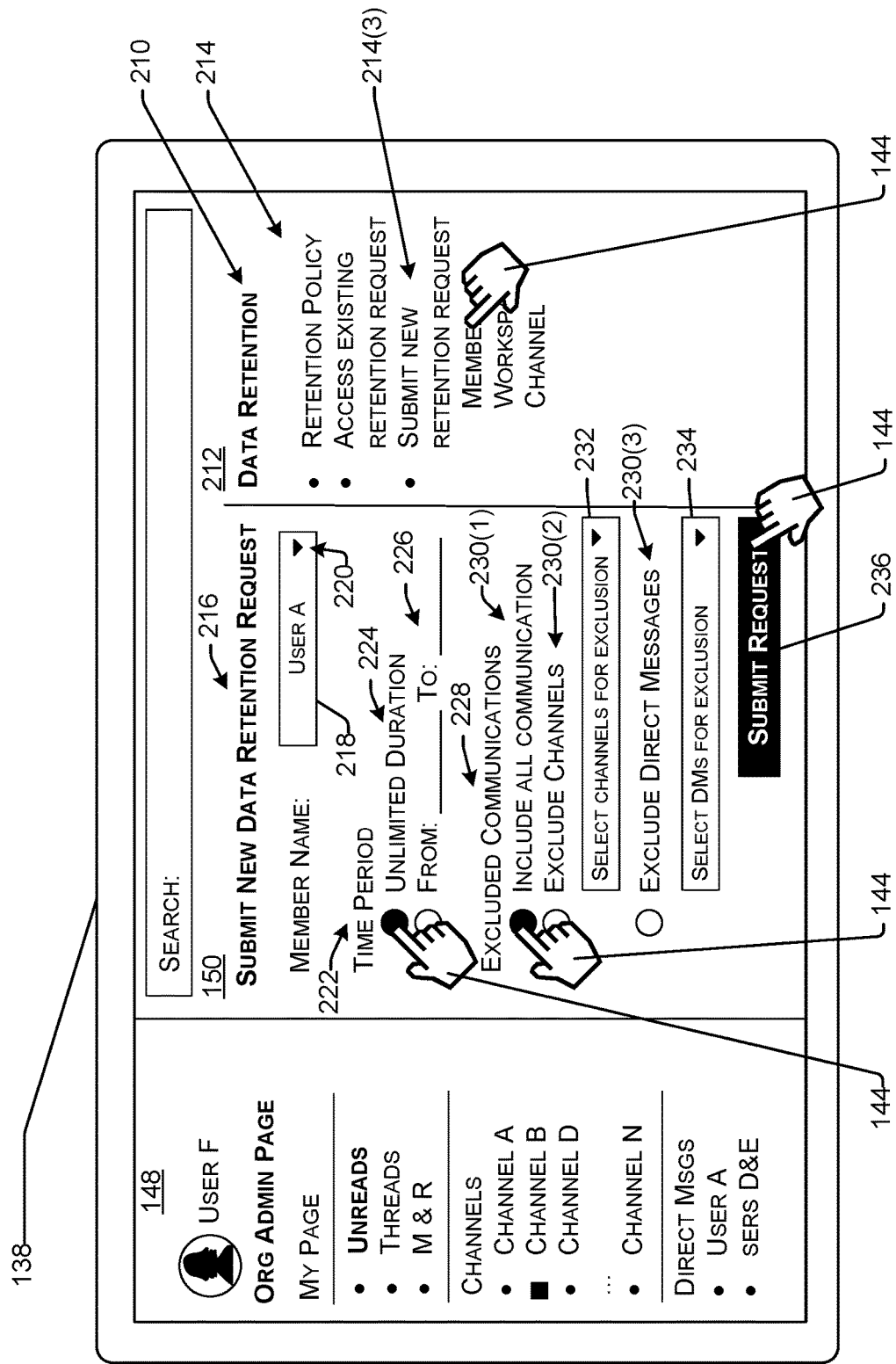

FIGS. 2A and 2B illustrate an example user interface for specifying a data retention rule associated with data including a characteristic, as described herein. FIG. 2A illustrates additional details associated with the user interface 138 that presents data associated with an administration of an account of an organization, as described above with reference to FIG. 1.

As described above, in at least one example, the user interface 138 can include a first region 140, or pane, that includes indicator(s) (e.g., user interface element(s) or object(s)) of workspace(s) with which the user (e.g., account of the user) is associated. As illustrated in FIG. 2A, the user 144 (e.g., User F, administrator 144) can be an administrator of the account of the organization. In such an example, the user 144 can be the user designated to manage the account of the organization. Based on the designation as the administrator 144, the first region 140 can include an organization administration indicator 142.

Additionally or alternatively, the first region 140 can include one or more channel indicators 202, one or more direct messaging instance indicators 204, and the like. In some examples, the channel indicator(s) 202 may be grouped based on one or more workspaces associated therewith. In various examples, communication channels associated with the channel indicator(s) 202 and/or direct messaging instances associated with the direct messaging instance indicator(s) 204 can be associated with a same organization (e.g., associated with a same organization identifier). In some examples, one or more of the communication channel(s) and/or direct messaging instance(s) can be associated with users of different organizations (e.g., users that are associated with different organization identifiers). In some examples, a first communication channel can be associated with users from a single organization (e.g., associated with a same organization identifier) and a second communication channel can be associated with users from two or more different organizations (e.g., associated with different organization identifiers).

In various examples, the user 144 can navigate between channels and/or direct messaging instances via the respective channel indicator(s) 202 and/or direct messaging indicator(s) 204, presented in the first region. In at least one example, the user can navigate to an organization administration page 148 via the organization administration indicator 142. In such an example, a user account of the user 144 (e.g., User) can be associated with managing a group-based communication account of the organization. Non-limiting examples of the indicators described herein (e.g., channel indicator(s) 202, direct messaging indicator(s) 204, and/or organization administration indicator 142) can include icons, symbols, links, tabs, or other user interface elements or objects. In some examples, such indicators can be associated with actuation mechanisms to enable the user 144 to select an indicator and transition to another page associated with the respective indicator (e.g., page associated with a particular channel, organization administration page 148, etc.). In some examples, a visual indicator can indicate which page a user is currently interacting with and/or has most recently interacted with. For example, the organization administration indicator 142 is outlined in a heavier weight than other channel indicators 202 and/or direct messaging instance indicator(s) 204, thereby indicating that the user 144 is currently interacting with the organization administration page 148.

As illustrated in FIG. 2A, the organization administration page 148 can include one or more administrative functions 146 associated with managing the group-based communication account of the organization. The administrative functions 146 can include establishing or modifying settings, permissions, organization data retention, management of members, channels, workspaces, configuring access and security, and exporting data associated with the group-based communication account of the organization. As a non-limiting example, the settings and permissions may include managing how users join the account, managing shared channel permissions, establishing organizational policies, setting channel management tools and/or preferences, defining one or more default settings (e.g., do not disturb hours, channels for new users, languages of a workspace or organization, etc.), or the like. As a non-limiting example, management of members, channels, and workspaces may include customizations (e.g., user profiles, workspaces, display names, managing duplicate users, channels, etc.), inviting new users to a workspace, deactivate or reactivate a user account, or the like. As a non-limiting example, a configuration of access and security may include setting default sign-ins for users, user authentication, guest invitation permissions, reset of single sign-on sessions, modifying a single sign-on provider, establishing security and data policies for shared channels, direct messaging instances, and/or workspaces, and the like.

As illustrated in FIG. 2A, the administrative functions 146 may include an organization data retention indicator 206 and an exporting data indicator 208. In some examples, the exporting data indicator 208 can enable the administrator 144 to export data associated with an organization. In some examples, the exporting data indicator 208 can enable the administrator 144 to export data associated with one or more specified data retention rules. Responsive to receiving a request to export data associated with a specified data retention rule, the communication platform may identify one or more communications (e.g., messages, data associated therewith, etc.) associated with the specified data retention rule and may send a report including the one or more communications for presentation via the user interface 138.

In various examples, the organization data retention indicator 206 can enable the administrator 144 set and/or establish a specified data retention rule associated with one or more characteristics. In such examples, the specified data retention rule can comprise a first period of time for storing data associated with the characteristic(s) that is different from a second period of time associated with a data retention rule of the organization. In various examples, responsive to receiving an indication of selection of the organization data retention indicator 206, the communication platform may cause a data retention page 210 to be presented to the user 144, such as to manage data retention associated with the group-based communication account of the organization. In some examples, the data retention page may be presented in a third region 212. In other examples, the data retention page 210 may be presented in the second region 150, such as in lieu of the organization administration page 148.

As illustrated in FIG. 2A, the data retention page 210 can include one or more data retention options 214. The data retention option(s) 214 can represent one or more actions the user 144 may take with respect to the data retention associated with the group-based communication account. In the illustrative example, the data retention page 210 includes three data retention option(s) 214. However, this is not intended to be so limiting, and the data retention page 210 can include a greater or lesser number of data retention options 214.

In various examples, the data retention page 210 can include a first data retention option 214(1) for managing a data retention rule associated with the organization. In various examples, the first data retention option 214(1) may enable the user 144 to establish a data retention rule associated with the organization. In such examples, the data retention rule may include an instruction for the communication platform to store data associated with the organization that is transmitted via the communication platform according to a retention period. The retention period can include a time period (e.g., five months, 10 months, 1 year, 2 years, etc.), a designated date (e.g., store data associated with the organization until a future date), a specified event (e.g., an action that takes place with regard to the communication platform, organization, etc.), or the like. In at least one example, the retention period can include a time period designating an amount of time that data associated with the organization and transmitted via the communication platform will be stored.

In various examples, the first data retention option 214(1) may enable the user 144 to establish and/or update the data retention rule associated with the organization. For example, the user 144 may establish, at a first time, a first data retention rule including an instruction for the communication platform to store data associated with the organization in perpetuity (e.g., as long as the account is active, forever, etc.). At a second time after the first time, the user 144 may select the first data retention option 214(1) and may change the data retention rule of the organization to a second data retention rule including an instruction for the communication platform to store data associated with the organization for one year. In some examples, the communication platform may establish a default data retention rule associated with the organization. In such examples, the user 144 may change the default data retention rule via the first data retention option 214(1).

In some examples, the data retention page 210 can include a second data retention option 214(2) for accessing an existing data retention request, such as that generated via the third data retention option 214(3), described in detail below. In various examples, responsive to receiving an indication of selection of the second data retention option 214(2), the communication platform may cause one or more existing specified data retention rules to be presented to the user 144, such as in the second region 150 or the third region 212. For example, at a first time, the user 144 submits a request for a specified data retention rule via the third data retention option 214(3), the request including an instruction to retain data associated with a particular user of the organization (different from the user 144). At a second time after the first time, the user 144 may select the second data retention option 214(2), such as to view the specified data retention rule. Responsive to receiving an indication of selection of the second data retention option 214(2), the communication platform may cause data associated with the specified data retention rule corresponding to the particular user to be presented via the user interface 138.

As discussed above, the data retention page 210 can include the third data retention option 214(3) for submitting new data retention requests associated with the organization. In some examples, the third data retention option 214(3) can enable the user 144 to submit one or more requests to specify a data retention rule associated with one or more characteristics. In the illustrative example, the third data retention option 214(3) can include options to submit the data retention request for one or more members, one or more workspaces, and one or more channels. In other examples, the third data retention option 214(3) can include additional or alternative options for the data retention request, such as one or more topics, conversations, dates, or the like.

In various examples, the user can select the third data retention option 214(3) for generating a new data retention request associated with a member. As illustrated in FIG. 2B, responsive to receiving the indication of selection, the communication platform causes a new data retention request submission page 216 to be presented via the user interface 138. In some examples, the new data retention request submission page 216 can be presented in the second region 150. In some examples, the new data retention request submission page 216 can be presented in the third region 212, such as in lieu of the data retention page 210.

In some examples, the user 144 can submit a request to specify a data retention rule associated with one or more communication channels and/or one or more workspaces. In such examples, a data retention rule associated with the organization may be specified with respect to the one or more communication channels and/or one or more workspaces associated with the organization. In the illustrative example, the user 144 can submits a request to specify a data retention rule associated with a particular member. In such an example, a data retention rule associated with the organization may be specified with respect to communications associated with the particular member.

As illustrated, the new data retention request submission page 216 can include a member name input 218. In various examples, the member name input 218 may provide a means by which the user 144 may submit a name (e.g., actual name, username, identifier, etc.) associated with the user corresponding to the specified data retention rule. In some examples, the member name input 218 can be configured to receive an input of the name, such as if the user 144 types the name in the member name input 218. For example, the user 144 may type @sierraz, a username associated with a member named Sierra Zulu, into the member name input 218. In some examples, the member name input 218 can include a drop-down menu selection 220. In such examples, responsive to selection of the drop-down menu selection 220, the member name input 218 can provide a list of eligible names for selection. For an illustrative example, user input in the member name input 218 is "User A". Though illustrated as a single user selected in the member name input 218, this is not intended to be limiting, and two or more users may be selected via the member name input 218. In such examples, the two or more users can be associated with the specified data retention rule.

In various examples, the specified data retention rule can include a default time period of unlimited duration (e.g., stored data associated with the specified data retention rule in perpetuity). In such examples, the communication platform can store data associated with the selected user(s) (e.g., user(s) input in the member name input 218) until the communication platform receives an indication of cancellation or deletion of the specified data retention rule. In various examples, the new data retention request submission page 216 may include a time period input section 222 via which the user 144 may designate a time period associated with the specified data retention rule. The time period input section 222 can include an unlimited duration selection 224 and/or a date input section 226. In various examples, the user 144 can select the unlimited duration selection 224 to cause the communication platform to store data associated with the user until the specified data retention rule is cancelled or deleted.

In some examples, the user 144 can select the date input section 226 to establish a defined time period associated with the data retention rule. In the illustrative example, the date input section 226 includes a date range, such as with a from (or beginning date) date and a to (or ending) date. In some examples, the date input section 226 can include the ending date. In such examples, the communication platform can store data associated with the specified data retention rule from a time of request submission and/or processing to the ending date. In various examples, responsive to determining that a current date is on or after the ending date, the communication platform may automatically cancel or delete the specified data retention rule. In such examples, the communication platform may cease associating an indicator with communications (e.g., messages, data, etc.) associated with the specified data retention rule. In some example, responsive to determining that a current date is on or after the ending date, the communication platform may delete or otherwise purge messages associated with the specified data retention rule. In some examples, responsive to determining that a current date is on or after the ending date, the communication platform may generate a report including the communications associated with the specified data retention rule. In such examples, the communication platform may store the report in a datastore, such as datastore 120. In some examples, the report may be accessible to the user 144, such as via a data export.

In various examples, the user 144 may exclude particular communications from the specified data retention rule via the excluded communications input section 228. In some examples, the excluded communications input section 228 can include a first option 230(1) to include all communications associated with a selected user. In some examples, responsive the receiving a selection of the first option 230(1), the communication platform can store any communications transmitted via the communication channel that are associated with the selected user (e.g., in which the selected user sends a message, receives a message, is mentioned in a message (e.g., @userA) etc.). For example, the selected user may be associated with three communication channels and six direct messaging instances. The communications platform may associate an indicator (e.g., a flag, a binary code, etc.) with messages transmitted via the three communication channels and the six direct messaging instances. The communication platform may store the transmitted messages based on the specified data retention rule.

In some examples, as discussed above, workspaces, communication channels, and/or direct messaging instances with which the selected user may be associated can include users that are associated with two or more different organizations (e.g., different from an organization associated with the user 144 and/or the selected user). In such examples, responsive the receiving a selection of the first option 230(1), the communication platform can store communications sent by the selected user via a workspace, an associated communication channel, and/or a direct messaging instance. For example, the selected user may be associated with a shared communication channel that includes users that are associated with three different organizations. The communication platform can associate the indicator with messages composed and sent by the selected user. The communication platform can store the messages with the associated indicator based on the specified data retention rule.

In some examples, the excluded communications input section 228 can include a second option 230(2) to exclude one or more communication channels from the specified data retention rule. In some examples, the second option 230(2) can include a channel input 232 via which the user 144 can input the one or more communication channels to be excluded from the specified data retention rule. In some examples, the channel input 232 can be configured to enable the user 144 to type in a channel name. In some examples, the channel input 232 can include a drop-down menu via which the user 144 may select the channel name for exclusion. For example, the selected user can be associated with a legal proceeding. Based on the legal proceeding, the user 144 may specify a data retention rule with respect to the selected user (e.g., specify a time period to store data associated with the selected user for a time period different from another time period associated with the data retention rule of the organization). The selected user can be associated with a communication channel via which associated users share "dad jokes" that are unrelated to the legal proceeding. As such, the user 144 can select the "dad jokes" channel to be excluded from the specified data retention rule. Responsive to receiving the input of the excluded "dad jokes" channel via the channel input 232, the communication platform may store the data sent via the "dad jokes" channel (e.g., a plurality of "dad jokes") based on the data retention rule associated with the organization. For another example, the selected user can be associated with a communication channel with a lawyer. Based on the attorney-client privileged communications therebetween, the communication channel with the lawyer may be excluded from the specified data retention rule.

In some examples, the excluded communications input section 228 can include a third option 230(3) to exclude one or more direct messages from the specified data retention rule. In some examples, the third option 230(3) can include a DM (e.g., direct message) input 234 via which the user 144 can input the one or more direct messaging instances to be excluded from the specified data retention rule. In some examples, the DM input 234 can be configured to enable the user 144 to type in a direct messaging instance name and/or one or more users associated therewith. In some examples, the DM input 234 can include a drop-down menu via which the user 144 may select the DM instance for exclusion. For example, the selected user can be associated with a direct messaging instance with the selected user's spouse. Based on the familial relationship and/or legally protected communications therewith, or for any other reason, the user 144 can select the direct messaging instance for exclusion from the specified data retention rule.

As illustrated in FIG. 2B, the new data retention request submission page 216 can include a submission selectable option 236 via which the user 144 may submit the request to specify a data retention rule associated with data including the one or more characteristics. In various examples, responsive to receiving an indication of selection of the submission selectable option 236, the communication platform can generate an instruction to associate an indicator with select communications associated with the request (e.g., communications associated with the selected user that are not excluded, such as via the second option 230(2), the third option 230(3), and/or the like). As discussed above, the communication platform can store the communications with the associated indicator for the time period indicated in the time period input section 222. In at least one example, the time period for storing the communications with the associated indicator is different from a time period associated with a data retention rule of the organization. In such an example, the communications with the associated indicator are stored for a different length of time than other communications associated with the organization and transmitted via the communication platform.

Figure 3:
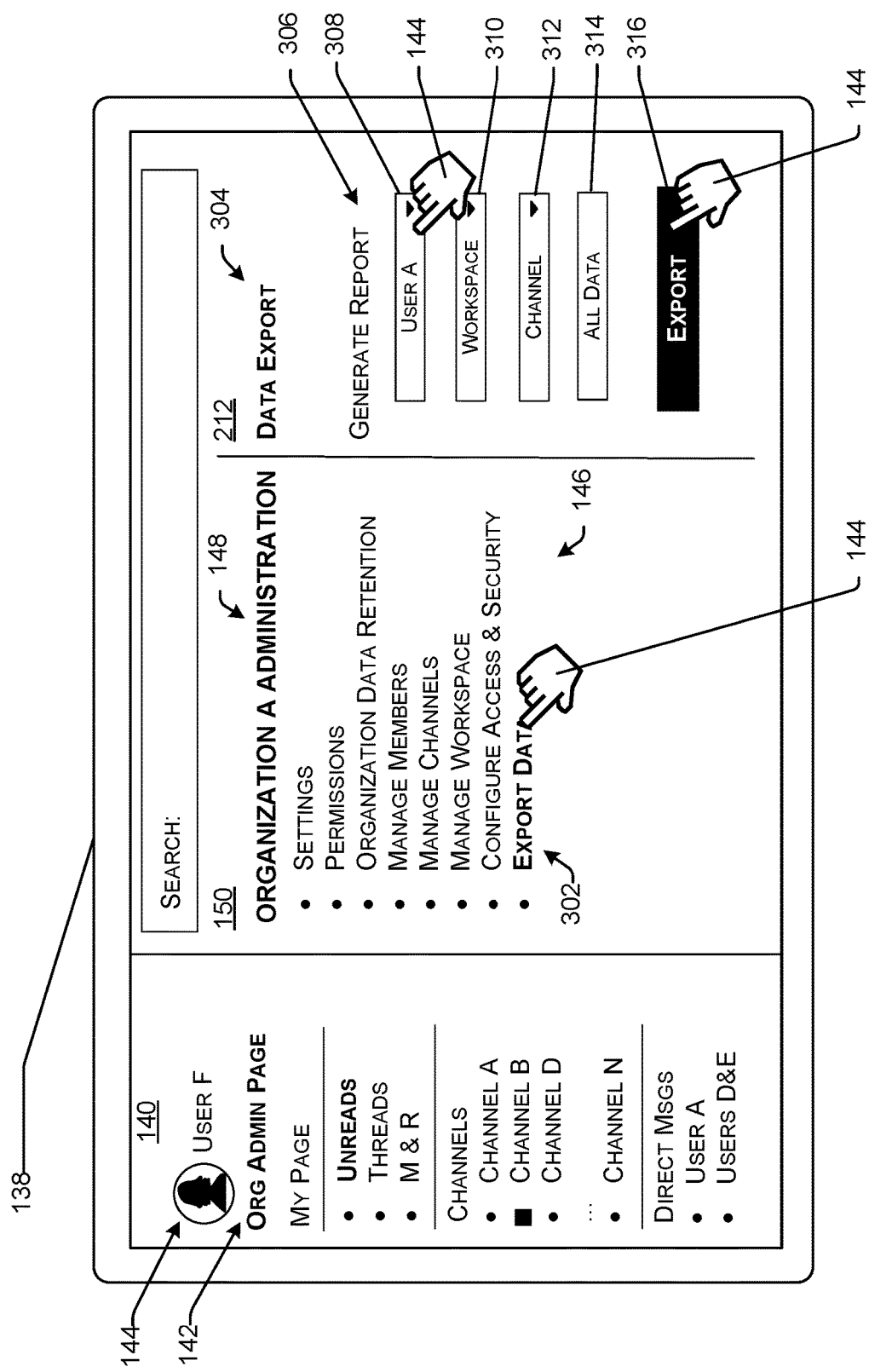
FIG. 3 illustrates an example user interface for viewing communications subject to a specified data retention rule, as described herein.

FIG. 3 illustrates an example user interface for viewing the communications stored based on a specified data retention rule. As described above, in at least one example, the user interface 138 can include a first region 140, or pane, that includes indicators of workspaces, channels, and/or direct messaging instances with which the user 144 is associated.

The user 144 can include an administrator of a group-based communication account of an organization. As such, the user 144 can be the user designated to manage the account of the organization. Based on a designation as the administrator 144, the first region can include an organization administration indicator 142.

As discussed above, responsive to receiving a selection of the organization administration indicator 142, the user interface 138 can present the organization administration page 148 in a second region 150, or pane. In various examples, the organization administration page 148 can include one or more administrative functions 146 associated with managing the group-based communication account of the organization. As a non-limiting example, the organization administration page 148 can include options to establish or modify settings, permissions, organization data retention, management of members, channels, workspaces, configuring access and security, and export data associated with the group-based communication account of the organization. In at least one example, the administrative function(s) 146 can include an export data function 302, such as export data indicator 208 of FIG. 2A.

In various examples, responsive to receiving an indication of selection of the export data function 302, the communication platform may cause a data export page 304 to be presented via the user interface. In the illustrative example, the data export page 304 is presented via the third region 212 or pane. In other examples, the data export page 304 can be presented via the second region 150, such as in lieu of the organization administration page 148.

In various examples, the data export page 304 can include a report generation menu 306 via which the user 144 can generate a report including communications associated with a specified data retention rule. In various example, the report generation menu 306 can include a user input 308, a workspace input 310, and/or a channel input 312. In various examples, the user input 308, the workspace input 310, and/or the channel input 312 can enable the user 144 to input a name associated with a respective category associated with the requested report (e.g., selected user, selected workspace, selected channel, etc.). In various examples, the user input 308, the workspace input 310, and/or the channel input 312 can include a drop-down menu via which the user 144 can select the name associated with the respective category. In such examples, the drop-down menu can surface one or more users, workspaces, and/or channels associated with a specified data retention rule. For example, an organization has associated therewith five specified data retention rules associated with five employees, users A-E. Responsive to receiving an indication of selection a user input 308, a drop-down menu including User A, User B, User C, User D, and User E can be presented to the user 144.

In the illustrative example, the user 144 selects User A for report generation. In such an example, the communication platform can identify one or more communications associated with User A to include in the report (e.g., exported data). In various examples, the communication(s) can include communications transmitted via a workspace associated with user A, a communication channel associated with User A, and/or a direct messaging instance associated with User A. In various examples, the communication(s) can include communications transmitted via one or more workspaces, communication channels, and/or direct messaging instances that are associated with a specified data retention rule (e.g., not excluded from the specified data retention rule). In at least one example, the communication(s) can include communications sent by User A via the communication platform.

Additionally or alternatively, the report generation menu 306 can include an all data selectable option 314, enabling the user 144 to export all data transmitted via the communication platform and stored in association with the organization.

In various examples, the data export page 304 can include an export selectable option 316. Responsive to receiving an indication of selection of the export selectable option 316, the communication platform can generate the report based on the user input 308, the workspace input 310, the channel input 312, and/or the all data selectable option 314. In various examples, the communication platform can cause the report to be presented via the user interface 138, such as in the second region 150 or the third region 212. In some examples, the communication platform can send the report to the user 144 via a communication channel or direct messaging instance or other means of communication (e.g., electronic mail, etc.). For example, a report associated with User A includes twenty (20) pages of communications associated with User A transmitted during a time period. A file including the report can be sent to the user 144 via a communication channel or direct messaging instance for presentation to the user 144.

FIGS. 4-8 are flowcharts showing example processes involving techniques as described herein. The processes illustrated in FIGS. 4-8 are described with reference to components described above with reference to the environment 100 shown in FIG. 1 for convenience and ease of understanding. However, the processes illustrated in FIGS. 4-8 are not limited to being performed using the components described above with reference to the environment 100. Moreover, the components described above with reference to the environment 100 are not limited to performing the processes illustrated in FIGS. 4-8.

The processes in FIGS. 4-8 are illustrated as collections of blocks in logical flow graphs, which represent sequences of operations that can be implemented in hardware, software, or a combination thereof. In the context of software, the blocks represent computer-executable instructions stored on one or more computer-readable storage media that, when executed by processor(s), perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the processes. In some embodiments, one or more blocks of the process can be omitted entirely. Moreover, the processes in FIGS. 4-8 can be combined in whole or in part with each other or with other processes.

As noted above, the processes illustrated in FIGS. 4-8 are described with reference to components described above with reference to the environment 100 shown in FIG. 1 for convenience and ease of understanding. FIG. 1, however, illustrates a single user computing device 104. In practice, the environment 100 can have multiple (e.g., tens of, hundreds of, thousands of, millions of, etc.) user computing devices that are each similarly configured to the user computing device 104. FIGS. 4-8 describe interactions (e.g., transmitted communications) between two or more user computing devices, each which can be configured similarly to the user computing device 104, and/or the server(s) 102.

Figure 4:
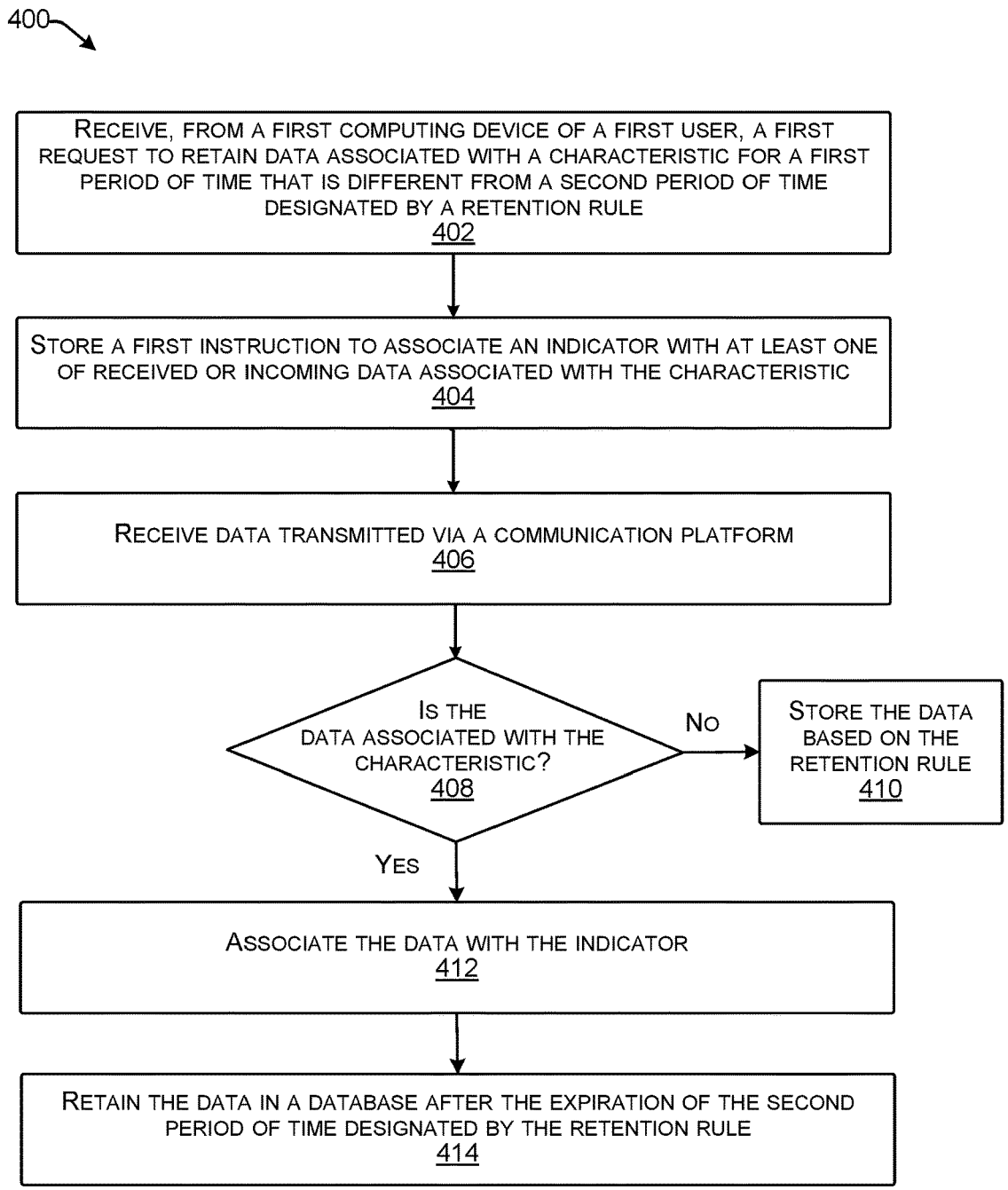
FIG. 4 illustrates an example process for storing data based on a specified data retention rule, as described herein.

FIG. 4 illustrates an example process 400 for storing data based on a specified data retention rule, as described herein.

At operation 402, a server 102 can receive, from a first computing device of a first user, a first request to retain data associated with a characteristic for a first period of time that is different from a second period of time designated by a data retention rule. The data retention rule can designate a period of time (e.g., the second period of time) for the server 102 to retain the data (e.g., communications (e.g., messages) transmitted via a communication platform and data associated therewith) in association with an organization. The second period of time associated with the data retention rule can include any length of time, such as 4 weeks, 6 months, 1 year, or the like.

In some examples, the first user can include a user associated with a third-party resource, such as a party or resource separate from the organization that is associated with managing a legal proceeding on behalf of the organization. In such examples, the first computing device can be associated with the third-party resource. In examples in which the first user and/or the first computing device are associated with the third-party resource, the server 102 may receive the first request via an application programming interface (API). In such examples, the API may be configured to facilitate communication between the third-party resource and the server 102 (e.g., a data retention component thereof).

In various examples, the first user can include an administrative user (e.g. administrator or owner, user 144) associated with the organization. In such examples, the first user can be the user designated to manage a group-based communication account associated with the communication platform. In various examples, the first user can establish the data retention rule for the organization. As discussed above, the first user can establish the data retention rule via an organization administration page, such as organization administration page 148 of a user interface associated with the communication platform, such as user interface 138 (e.g., via an instance of an application 134).

In various examples, the first user can generate the first request to retain data associated with a characteristic via the user interface. In some examples, the first computing device associated with the first user, such as user computing device 104, can send the first request to retain data associated with the characteristic to the server 102. The server 102 can receive the first request and identify the characteristic associated with the first request. The characteristic can include one or more users (e.g., a first user and/or a second user, a group of users, etc.), one or more communication channels, one or more workspaces, an organization, one or more dates (e.g., a range of dates), a conversation (e.g., messages transmitted within a time frame of one another), a topic (e.g., subject of a conversation, etc.), or the like. In other words, the first request can include a request to specify the data retention rule corresponding to communications comprising the characteristic (e.g., overriding the data retention rule of an organization for data associated with the characteristic).

In various examples, the first request can additionally include a request to exclude a communication channel, a direct messaging instance, and/or another user (e.g., communications between a selected user associated with the specified data retention rule and the other user) from the specified data retention rule. In such examples, the first request can designate a particular characteristic for data retention modification, but can exclude a particular communication channel or direct messaging instance from the specified data retention rule. For example, a second user of an organization may be associated with a legal proceeding. An account corresponding to the second user may include a communication channel entitled #dogs-and-cats, that includes dog and cat pictures, videos, memes, etc. The first user can determine that the #dogs-and-cats channel is unrelated to the legal proceeding and that communications associated therewith should be excluded from the specified data retention rule. Accordingly, the first user can include, with the first request, a request to exclude the #dogs-and-cats channel from the specified data retention rule.

In various examples, the first request can include a designated time period associated with the specified data retention rule (e.g., the first time period). In some examples, the designated time period can include an indefinite time period. In such examples, data associated with the characteristic can be stored until the server 102 receives a request to remove (e.g., delete) the specified data retention rule. In some examples, the first request can include a date range (e.g., from a first date to a second date, from a present date until a future date) and/or time period (e.g., 5 years, 7 years, 10 years, etc.) associated with the specified data retention rule.

At operation 404, the server 102 can store a first instruction to associate an indicator with at least one of received or incoming data with the characteristic. The indicator may provide an indication to not delete the associated data. In various examples, the received or incoming data can include one or more messages transmitted via the communication platform and/or data associated therewith (e.g., files, emojis, reactjis, animated emojis, edits, etc.). In various examples, the first instruction can be stored in a datastore associated with the server, such as datastore 120.

At operation 406, the server 102 can receive data transmitted via a communication platform. The data can include a communication or message transmitted via the communication platform, such as from a first user computing device to a second user computing device. The data can include a time stamp associated with message generation, transmission, and/or delivery. The data can include a sending user identifier, a receiving user identifier, a first organization identifier associated with the sending user, a second organization identifier associated with the receiving user, and the like. The first organization identifier can be the same or different from the second organization identifier.

In some examples, the data can include a communication channel identifier. In such examples, the communication channel identifier can indicate a communication channel via which the data is transmitted. In some examples, the communication channel identifier may be associated with one or more user identifiers corresponding to the users associated with the communication channel (e.g. the sending user and one or more receiving users). The server 102 can cause the data to be presented to the users corresponding to the user identifiers associated with the communication channel identifier. In various examples, the data can include data associated with a workspace. In such examples, the data can include a workspace identifier. In some examples, the workspace can include one or more communication channels associated therewith. In such examples, the data can include the workspace identifier and a communication channel identifier associated with the communication channel associated with the data.

In some examples, the data can include a direct messaging (DM) instance identifier. In such examples, the DM instance identifier can indicate a direct messaging instance via which the data is transmitted. In some examples, the DM instance identifier can be associated with at least two user identifiers corresponding to the users associated with the DM instance. In some examples, the DM instance identifier can be associated with the sending user identifier and the receiving user identifier. In some examples, the DM instance identifier can be associated with the sending user identifier and two or more receiving user identifiers, such as in a multiple person direct messaging instance. The server 102 can cause the data to be presented to the users corresponding to the user identifiers associated with the DM instance identifier.

At operation 408, the server 102 can determine whether the data is associated with the characteristic. In various examples, the server 102 can determine whether the data has associated therewith a user identifier, a communication channel identifier, and/or a DM instance identifier that is associated with the characteristic. For example, the characteristic can include a user identifier associated with a user. The server 102 can receive a message including the user identifier. Based on a determination that the user identifier is associated with the message, the server 102 can determine that the data is associated with the characteristic.

Based on a determination that the data is not associated with the characteristic ("No" at operation 408), the server 102, at operation 410, can store the data based on the data retention rule. In various examples, the server 102 can determine, based on the determination that the data is not associated with the characteristic, that the data is not associated with the specified data retention rule. In such an example, the server 102 can store the data or the first period of time designated by the data retention rule.

Based on a determination that data is associated with the characteristic ("Yes" at operation 408), the server 102, at operation 412, can associate the data with the indicator. As discussed above, the indicator can provide an indication to the server 102 to not delete the message. The indicator can include a flag or other indication to retain the message for the first period of time, such as that designated n the first request to retain data associated with the characteristic.

At operation 414, the server 102 can retain the data in a database after the expiration of the second period of time designated by the data retention rule. In at least one example, the server 102 can determine to not delete or otherwise purge the data based on the indicator. In various examples, the server 102 can execute a deletion instruction to delete or otherwise purge communications and associated data per the data retention rule associated with the organization. The server 102 can determine a time associated with the communications. The server can then determine whether the communications have associated therewith the indicator. If the indicator is not associated with the message, the server 102 can delete or otherwise purge the message. If the indicator is associated with the message, the server 102 can retain the message. In various examples, the data retention rule associated with the organization can reduce a total amount of data storage associated with the organization and processing power required to manage the data storage. As such, the techniques described herein can improve both the functioning of both the computing device(s) associated with the server 102 and the user computing device(s) 104 associated with the organization.

Figure 5:
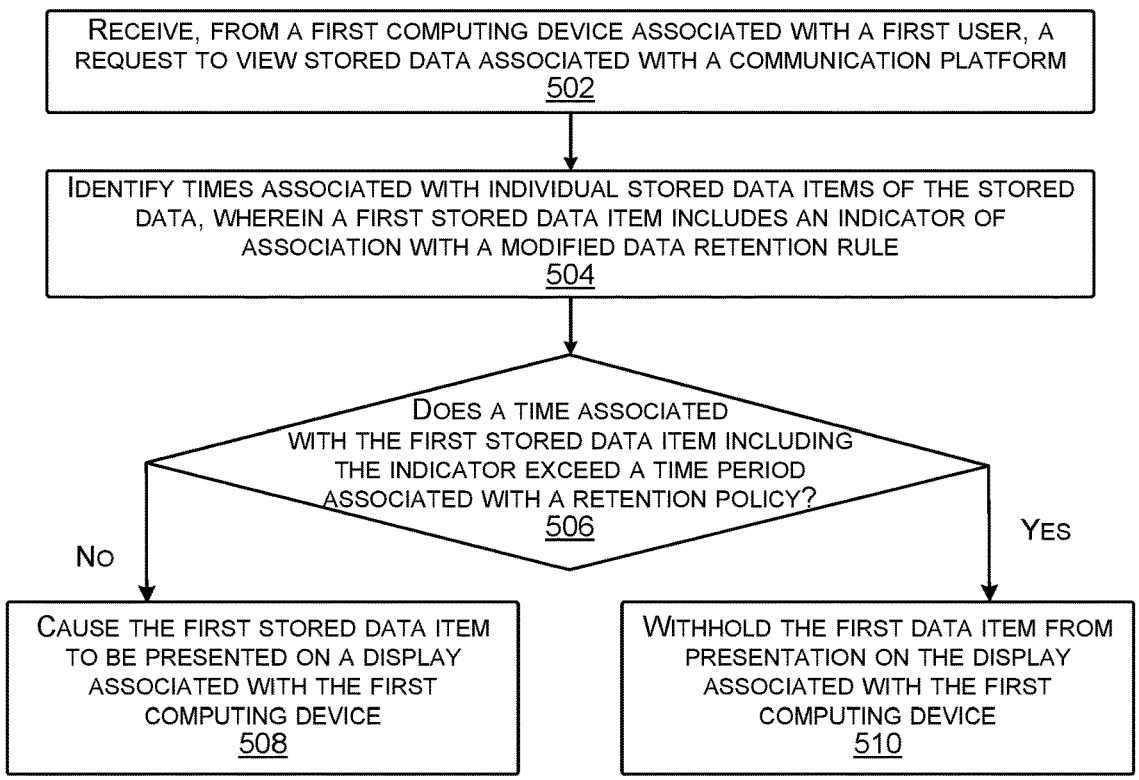
FIG. 5 illustrates an example process for rendering data on a display based on a data retention rule, as described herein.

FIG. 5 illustrates an example process 500 for rendering data on a display based on a data retention rule, as described herein.

At operation 502, a server 102 can receive, from a first computing device of a first user, a request to view data associated with a communication platform. The first computing device can include a user computing device 104. In some examples, the first computing device can be associated with an administrative user corresponding to an organization, or another member (e.g., user) of the organization. In various examples, the request to view data can include a request to view a conversation held via the communication platform, such as via in association with a workspace, a communication channel, a direct messaging instance, or the like.

In some examples, the first user can include a user associated with a third-party resource, such as a party or resource separate from the organization that is associated with managing a legal proceeding on behalf of the organization. In such examples, the first computing device can be associated with the third-party resource. In examples in which the first user and/or the first computing device are associated with the third-party resource, the server 102 may receive the request to view data associated with the communication platform via an application programming interface (API). In such examples, the API may be configured to facilitate communication between the third-party resource and the server 102 (e.g., a data retention component thereof).

In various examples, the data associated with the communication platform can include communications transmitted via a workspace, a communication channel, a thread associated therewith, a DM instance, or the like. In some examples, the request to view data can include a user scrolling through messages previously sent (e.g., messages transmitted in the past). In some examples, a user computing device can store a number of messages on a local datastore of the user computing device. In such examples, to view other messages (e.g., older messages) than those stored on the local datastore, the first computing device (e.g., an instance of the application 134 thereon) may send the request to the server 102 to view the data.

At operation 504, the server 102 can identify times associated with individual stored data items of the stored data, wherein a first stored data item includes an indicator of association with a specified data retention rule. The individual stored data items can include one or more messages (e.g., communications) and/or associated data sent via the communication platform. The times can include a time stamp associated with generation, transmission, and/or delivery of the individual stored data items (e.g., messages, communications, etc.). The individual stored data items can include a sending user identifier, a receiving user identifier, a first organization identifier associated with the sending user, a second organization identifier associated with the receiving user, and the like. The first organization identifier can be the same or different from the second organization identifier.

In various examples, the individual stored data items can include at least one of a workspace identifier, a communication channel identifier, a DM instance identifier. In such examples, the individual stored data items can include at least one identifier associated with a transmission channel (e.g., group of intended recipients or viewers of the individual stored data items.

In various examples, the server 102 can receive, at a first time, the first stored data item and can determine that the first stored data item includes a characteristic associated with a specified data retention rule. In some examples, the server 102 can determine that the first stored data item includes the characteristic based on one or more of a sending user identifier, a receiving user identifier, a first organization identifier, a second organization identifier, a workspace identifier, a communication channel identifier, and/or a DM instance identifier associated therewith.

Based on a determination that the first stored data item includes the characteristic, the server 102 can associate the indicator therewith. The indicator may provide an indication to not delete or otherwise purge the first stored data item. The server 102 can then store the first stored data with the associated indicator in a datastore, such as datastore 120.

At operation 506, the server 102 can determine whether a time associated with the first stored data item including the indicator exceeds a time period associated with a retention policy (e.g., data retention policy). As discussed above, an administrative user can establish a retention policy associated with an organization. The retention policy can designate a time period for which the server (e.g., communication platform) stores the data items associated with the organization. The time period can include any time period, such as nine months, one year, two years, or the like.

In various examples, the server 102 can compare the time associated with the first stored data item (e.g., the time associated with generation, transmission, delivery, etc.) to the time period associated with the retention policy.

Based on a determination that the time associated with the first stored data item does not exceed the time associated with the retention policy ("No" at operation 506), the server 102, at operation 508 can cause the first stored data item to be presented on a display associated with the first computing device. In such examples, the server 102 determines that the first stored data item is not older than a time period associated with the retention policy. For example, a first stored data item can have a time associated therewith that is six months old and a data retention policy associated with an organization can be one year. Because the first stored data item is less than one year old (e.g., within the time period of the data retention rule), the server 102 can determine to cause the first stored data item to be presented on the display associated with the first computing device.

Based on a determination that the time associated with the first stored data item exceeds the time associated with the retention policy ("Yes" at operation 506), the server 102, at operation 510 can withhold the first stored data item from presentation on the display associated with the first computing device. In some examples, the server 102 can determine, based on a determination that the first stored data item is older than the time period associated with the data retention rule, to withhold the first stored data item from presentation.

Figure 6:
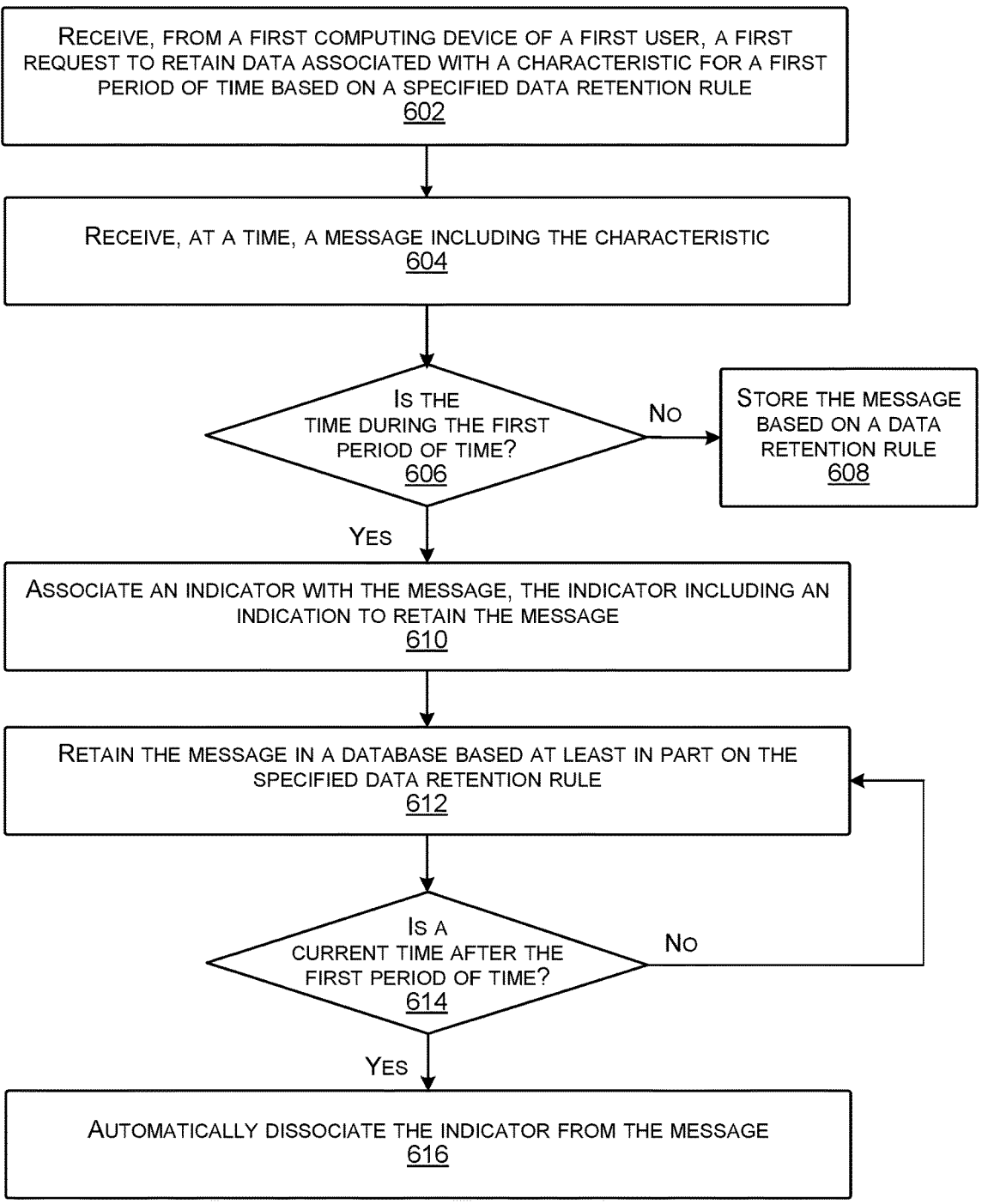
FIG. 6 illustrates another example process for removing a specified data retention rule after a time period associated therewith, as described herein.

FIG. 6 illustrates another example process 600 for removing a specified data retention rule after a time period associated therewith, as described herein.

At operation 602, a server 102 can receive, from a first computing device of a first user, a first request to retain data associated with a characteristic for a first period of time based on a specified data retention rule. The specified data retention rule may include a modification to a data retention rule of an organization. The data retention rule can designate a period of time (e.g., 5 months, 10 months, 2 years, etc.) for the server 102 to retain the data (e.g., communications (e.g., messages) transmitted via a communication platform and data associated therewith) in association with an organization.

In some examples, the first user can include a user associated with a third-party resource, such as a party or resource separate from the organization that is associated with managing a legal proceeding on behalf of the organization. In such examples, the first computing device can be associated with the third-party resource. In examples in which the first user and/or the first computing device are associated with the third-party resource, the server 102 may receive the first request via an application programming interface (API). In such examples, the API may be configured to facilitate communication between the third-party resource and the server 102 (e.g., a data retention component thereof).

In various examples, the first user can include an administrative user (e.g. administrator or owner, user 144) associated with the organization. In such examples, the first user can be the user designated to manage a group-based communication account associated with the communication platform. In various examples, the first user, based on the designation as the administrative user, can submit the first request to retain data associated with the characteristic. The characteristic can include one or more users (e.g., a first user and/or a second user, a group of users, etc.), one or more communication channels, one or more workspaces, one or more dates (e.g., a range of dates), an organization, a conversation (e.g., messages transmitted within a time frame of one another), a topic (e.g., subject of a conversation, etc.), or the like. In other words, the first request can include a request to specify the data retention rule of an organization for communications comprising the characteristic (e.g., overriding the data retention policy for data associated with the characteristic). In various examples, the characteristic can be identified based on one or more identifiers. The identifiers can include user identifiers (e.g., legal name of user, username, letters, numbers and/or symbols associated with a user, etc.), organization identifier, workspace identifiers, communication channel identifiers, DM instance identifiers, In various examples, the first request can additionally include a communication channel, a direct messaging instance, and/or other user to exclude from the specified data retention rule. In such examples, the first request can designate a particular characteristic for data retention modification, but can exclude a particular communication channel, direct messaging instance, or other user from the specified data retention rule. For example, a second user of an organization may be associated with a legal proceeding. An account corresponding to the second user may include a direct messaging instance between the second user and a third user, a child of the second user. The first request can include a request to exclude the direct messaging instance between the second user and the third user.

In various examples, the first request can include a designated time period associated with the specified data retention rule (e.g., the first time period). In some examples, the designated time period can include an indefinite time period. In such examples, data associated with the characteristic can be stored until the server 102 receives a request to remove (e.g., delete) the specified data retention rule. In some examples, the first request can include a date range (e.g., from a first date to a second date, from a present date until a future date) and/or time period (e.g., 5 years, 7 years, 10 years, etc.) associated with the specified data retention rule.

At operation 604, the server 102 can receive, at a time, a message including the characteristic. In various examples, the server 102 can determine that the message includes the characteristic based on one or more identifiers associated therewith (e.g., user identifier, organization identifier, workspace identifier, communication channel identifier, DM instance identifier, etc.). In some examples, the server 102 can determine that the message includes the characteristic based on a user computing device from which the message was received. In some examples, the server 102 can determine that the message includes the characteristic based on a designated recipient associated with the message.

At operation 606, the server 102 can determine whether the time is during the first period of time. The first period of time can include the period of time associated with the specified data retention rule.

Based on a determination that the time is during not during the first period of time ("No" at operation 606), the server 102, at operation 608 can store the message based on a data retention rule. In various examples, messages transmitted at a time that is not within the first period of time associated with the specified data retention rule can be stored based on the data retention rule of the organization, regardless of whether the messages include the characteristic.

Based on a determination that the time is during the first period of time ("Yes" at operation 606), the server 102, at operation 610 can associate an indicator with the message, the indicator including an indication to retain the message. The indicator can include a flag or other indicator providing an indication for the server 102 to not delete the message, such as during a periodic and/or intermittent data purge, such as based on the data retention rule associated with the organization.

At operation 612, the server 102 can retain the message in a database based at least in part on the specified data retention rule. In various examples, the message including the indicator can be stored in the database, such as datastore 120.

At operation 614, the server 102 can determine whether a current time is after the first period of time. In some examples, the current time can be a time after the time at which the message was received.

Based on a determination that the current time is not after the first period of time ("No" at operation 614), the server 102, at operation 616 can retain the message in the database as described with regard to operation 612.

Based on a determination that the current time is after the first period of time ("Yes" at operation 614), the server 102, at operation 616 can automatically dissociate the indicator from the message (e.g., dissociate the indicator from previously stored data). In some examples, the server 102 can determine that the specified data retention rule is expired (e.g., no longer active) based on the determination that the current time is after the first period of time. In various examples, the server 102 can dissociate the indicator from the message without an additional interaction or an instruction from the user. In various examples, the server 102 can automatically dissociate the indicator from other, previously stored messages, associated with the characteristic.

In various examples, after dissociating the indicator from the message, the server 102 can store the message based on a data retention rule associated with the organization. In some examples, the server 102 can determine that the time associated with the message (e.g., timestamp, time associated with generation, transmission, delivery, etc.) exceeds (e.g., is not within) a second period of time associated with the data retention rule. In such examples, the server 102 can delete or otherwise purge the message.

Figure 7:
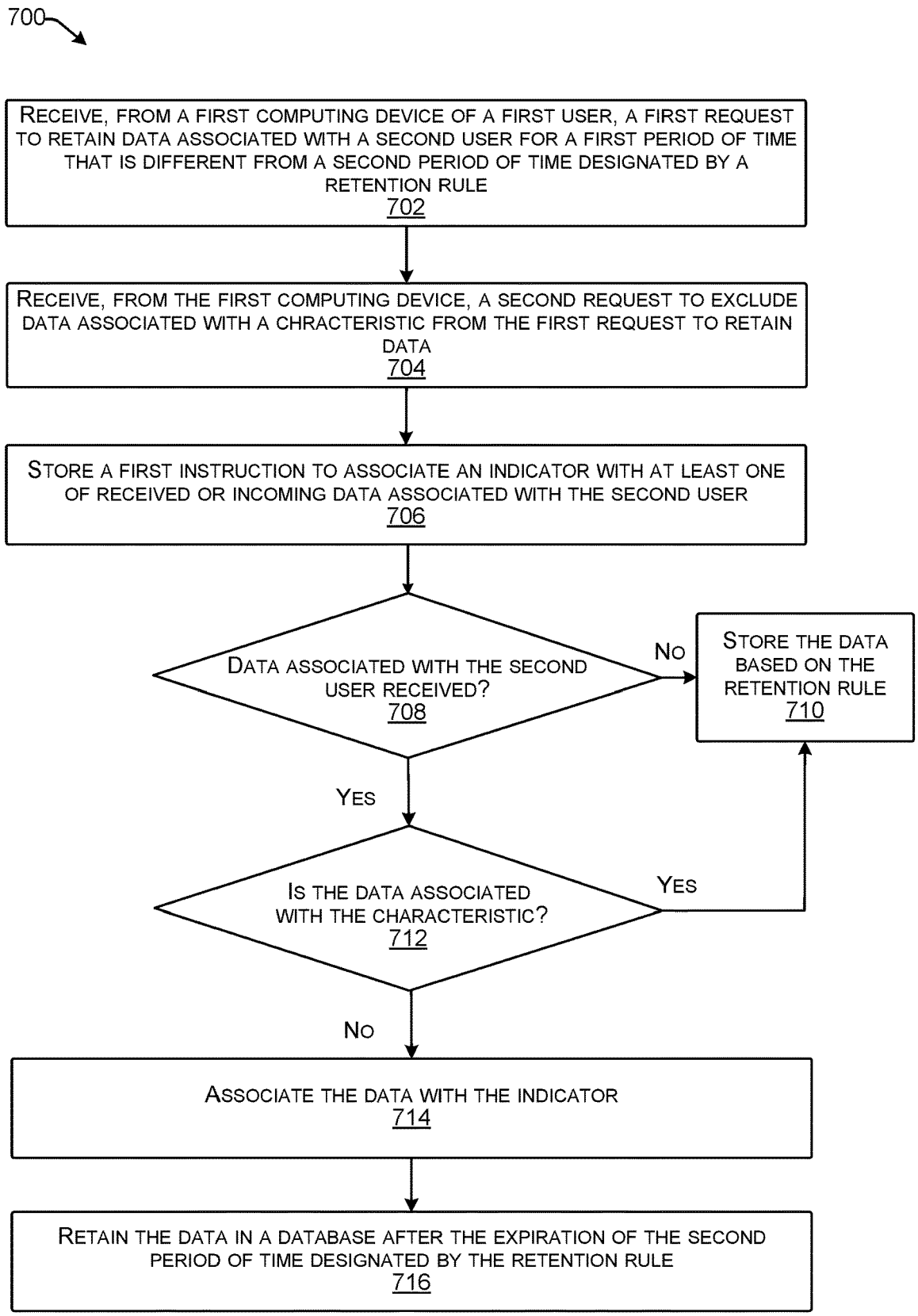
FIG. 7 illustrates an example process for excluding a communication channel from a specified data retention rule, as described herein.

FIG. 7 illustrates an example process 700 for excluding a communication channel from a specified data retention rule, as described herein.

At operation 702, a server 102 can receive, from a first computing device of a first user, a first request to retain data associated with a second user for a first period of time that is different from a second period of time designated by a data retention rule. The data retention rule can designate a period of time (e.g., the second period of time) for the server 102 to retain the data (e.g., communications (e.g., messages) transmitted via a communication platform and data associated therewith) in association with an organization. The second period of time associated with the data retention rule can include any length of time, such as 4 weeks, 6 months, 1 year, or the like.

In some examples, the first user can include a user associated with a third-party resource, such as a party or resource separate from the organization that is associated with managing a legal proceeding on behalf of the organization. In such examples, the first computing device can be associated with the third-party resource. In examples in which the first user and/or the first computing device are associated with the third-party resource, the server 102 may receive the first request via an application programming interface (API). In such examples, the API may be configured to facilitate communication between the third-party resource and the server 102 (e.g., a data retention component thereof).

In various examples, the first user can include an administrative user (e.g. administrator or owner, user 144) associated with the organization. In such examples, the first user can be the user designated to manage a group-based communication account associated with the communication platform. In various examples, the first user can establish the data retention rule for the organization. As discussed above, the first user can establish the data retention rule via an organization administration page, such as organization administration page 148 of a user interface associated with the communication platform, such as user interface 138 (e.g., via an instance of an application 134).

In various examples, the first user can generate the first request to retain data associated with the second user via the user interface. In some examples, the first computing device associated with the first user, such as user computing device 104, can send the first request to retain data associated with the second user to the server 102. The server 102 can receive the first request and identify the second user associated with the first request. In various examples, the server 102 can identify the second user based on a user identifier associated therewith (e.g., legal name, username, combination of letters, numbers, symbols representative of the second user, etc.).

In various examples, the first request can include a designated time period associated with the specified data retention rule (e.g., the first time period). In some examples, the designated time period can include an indefinite time period. In such examples, data associated with the second user can be stored until the server 102 receives a request to remove (e.g., delete) the specified data retention rule. In some examples, the first request can include a date range (e.g., from a first date to a second date, from a present date until a future date) and/or time period (e.g., 5 years, 7 years, 10 years, etc.) associated with the specified data retention rule.

At operation 704, the server 102 can receive, from the first computing device, a second request to exclude data associated with a characteristic from the first request to retain data. The characteristic can include at least one communication channel, direct messaging instance, other user, type of data, a topic, a conversation, or the like. In various examples, the second request can be included in the first request to specify the data retention rule. In such examples, the first request can designate the second user for data retention modification, and the second request can cause data associated with the characteristic to be excluded from the specified data retention rule.

In various examples, the second request can include a name, title, one or more identifiers, or the like, indicating the characteristic associated with data to be excluded from the specified data retention rule. Responsive to receiving the second request, the server 102 can generate the specified data retention rule to retain data associated with the second user except data associated with the characteristic.

At operation 706, the server 102 can store a first instruction to associate an indicator with at least one of received or incoming data associated with the second user. In various examples, the received or incoming data can include a communication (e.g., message) and/or associated data transmitted via the communication platform. In various examples, the instruction can include an indication to save data (e.g., not delete) associated with the second user. In some examples, the received or incoming data associated with the second user can include data sent (e.g., transmitted) by the second user. In some examples, the received or incoming data associated with the second user can include data received by the second user (e.g., the second user is an intended recipient). In some examples, the received or incoming data associated with the second user can include data in which the second user is specifically mentioned, such as by an @seconduser identifier associated with the data.

At operation 708, the server 102 can determine whether data associated with the second user is received. In various examples, the server 102 can determine whether the data is associated with the second user based on one or more user identifiers associated with the data. In such examples, the server 102 can determine whether the data is associated with the second user based on a user identifier associated with the second user being associated with the message. In some examples, the server 102 determines that the data is associated with the second user based on the user identifier associated with the second user being a sending user identifier associated with the data. In some examples, the server 102 determines that the data is associated with the second user based on the user identifier associated with the second user being a receiving user identifier associated with the data. In some examples, the server 102 determines that the data is associated with the second user based on the user identifier associated with the second user being an identifier associated with a mention (e.g., @mention) associated with the data.

Based on a determination that data associated with the second user is not received ("No" at operation 708), the server 102, at operation 710, can store the data based on the data retention rule. In some examples, the server 102 determines that the data is not associated with the second user, such as based on an absence of a user identifier associated with the second user corresponding to the data.

Based on a determination that data associated with the second user is received ("Yes" at operation 708), the server 102, at operation 712, can determine whether the data is associated with the characteristic. In some examples, the server 102 determines that the data is associated with the characteristic based on an identifier associated therewith (e.g., communication channel identifier, direct messaging instance identifier, user identifier, etc.).

Based on a determination that data is associated with the characteristic ("Yes" at operation 712), the server 102, at operation 710, can store the data based on the data retention rule. In some examples, the server 102 can determine that the data is associated with the characteristic that is excluded from the specified data retention rule. In such examples, based on the determination that the data is associated with the characteristic, the server 102 can store the data based on the data retention rule.

Based on a determination that data is not associated with the characteristic ("Yes" at operation 712), the server 102, at operation 714, can associate the data with the indicator. As discussed above, the indicator may provide an indication to the server 102 to not delete or otherwise purge the data. In some examples, the indicator may be associated with the data for a pre-determined time period (e.g., the first time period). In such examples, the first request to retain data associated with the second user may designate the first time period for associating the indicator with the data.

At operation 716, the server 102 can retain the data in a database after the expiration of the second period of time designated by the data retention rule. In various examples, the server 102 can retain the data such that it is not accessible to other users associated with the organization. In such examples, the data can be stored but not rendered for presentation to the other users. In some examples, the data can be provided to the first user (e.g., administrative user) via an export data function.

Figure 8:
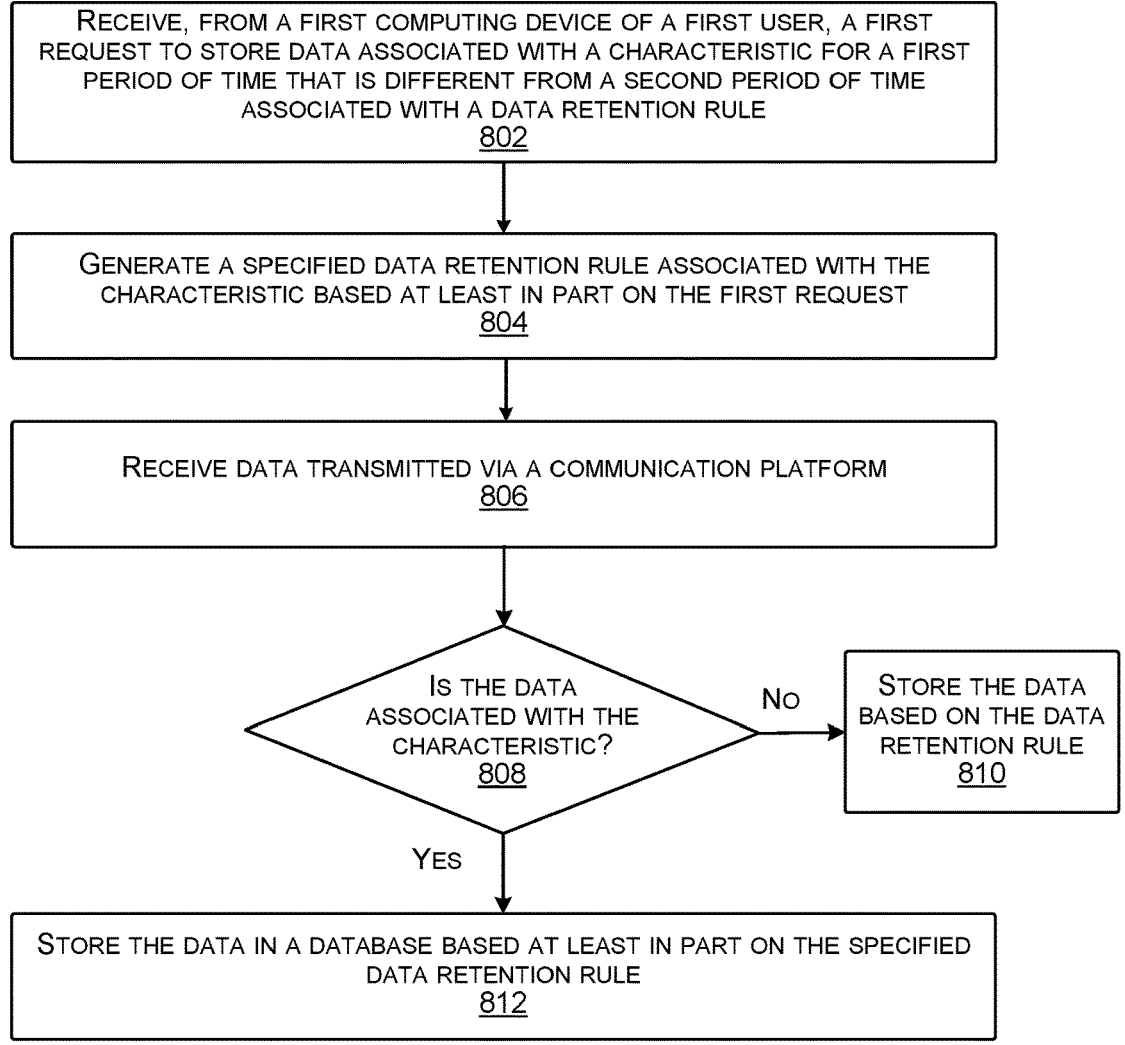
FIG. 8 illustrates an example process for storing data based on a specified data retention rule, as described herein.

FIG. 8 illustrates an example process 800 for storing data based on a specified data retention rule, as described herein.

At operation 802, a server 102 can receive, from a first computing device of a first user, a first request to store data associated with a characteristic for a first period of time that is different from a second period of time associated with a data retention rule of an organization. The data retention rule can designate a period of time (e.g., the second period of time) for the server 102 to retain the data (e.g., communications (e.g., messages) transmitted via a communication platform and data associated therewith) in association with an organization. The period of time associated with the data retention rule can include any length of time, such as 4 weeks, 6 months, 1 year, or the like.

In some examples, the first user can include a user associated with a third-party resource, such as a party or resource separate from the organization that is associated with managing a legal proceeding on behalf of the organization. In such examples, the first computing device can be associated with the third-party resource. In examples in which the first user and/or the first computing device are associated with the third-party resource, the server 102 may receive the first request via an application programming interface (API). In such examples, the API may be configured to facilitate communication between the third-party resource and the server 102 (e.g., a data retention component thereof).

In various examples, the first user can include an administrative user (e.g. administrator or owner, user 144) associated with the organization. In such examples, the first user can be the user designated to manage a group-based communication account associated with the communication platform. In various examples, the first user can establish the data retention rule for the organization. As discussed above, the first user can establish the data retention rule via an organization administration page, such as organization administration page 148 of a user interface associated with the communication platform, such as user interface 138 (e.g., via an instance of an application 134).

In various examples, the first user can generate the first request to specify the data retention rule associated with the characteristic via the user interface. In some examples, the first computing device associated with the first user, such as user computing device 104, can send the first request to specify the data retention rule to the server 102. The server 102 can receive the first request and identify the characteristic associated therewith. In various examples, the server 102 can identify the characteristic based on an identifier associated therewith (e.g., user identifier, workspace identifier, communication channel identifier, DM instance identifier, etc.).

In various examples, the first request can include a designated time period associated with a specified data retention rule (e.g., the first time period). In some examples, the designated time period can include an indefinite time period. In such examples, data associated with the characteristic can be stored until the server 102 receives a request to remove (e.g., delete) the specified data retention rule. In some examples, the first request can include a date range (e.g., from a first date to a second date, from a present date until a future date) and/or time period (e.g., 5 years, 7 years, 10 years, etc.) associated with the specified data retention rule.

At operation 804, the server 102 can generate a specified data retention rule associated with the characteristic based at least in part on the request. In various examples, the server 102 can generate the specified data retention rule associated with the characteristic. In some examples, the specified data retention rule can include an instruction to associate an indicator with data (e.g., communications, messages, received data, incoming data, etc.) associated with the characteristic. In various examples, the specified data retention rule can include an instruction to retain (e.g., store) the data in a database, such as datastore 120, based on the specified data retention rule. In such examples, the data may be stored for the designated time period associated with the specified data retention rule.

At operation 806, the server 102 can receive data transmitted via a communication platform. In some examples, the data can include a message or communication transmitted via a workspace, and/or one or more communication channels associated therewith. In some examples, the data can include a message transmitted via a direct messaging instance. In some examples, the data can include files (e.g., .doc, .docx, .pdf, .jpeg, etc.), emojis, animated emojis, reactjis, or the like associated with the message. In various examples, the data may include metadata associated with the message (e.g., message data). In such examples, the metadata can include a time associated with the data (e.g., timestamp, data generation time, data transmission time, data delivery time, etc.), an identifier associated with the data (e.g., user identifier, workspace identifier, communication channel identifier, DM instance identifier, etc.), and/or other metadata corresponding to the data (e.g., message). be transmitted by a second user associated with the organization.

At operation 808, the server 102 can determine whether the data is associated with the characteristic. In some examples, the server can determine that the data is associated with the characteristic based on a determination that an identifier corresponding to the characteristic is associated with the data. In some examples, the server 102 can access the metadata associated with the data to determine one or more identifiers associated therewith. In some examples, the server 102 can compare the one or more identifiers associated with the data to an identifier associated with the characteristic to determine Based on a determination that the data is not associated with the characteristic ("No" at operation 808), the server 102, at operation 810, can store the data based on the data retention rule. As described above, the data retention rule may include an instruction to retain the data for a period of time determined by the first user (e.g., administrative user). The period of time associated with the data retention rule can include any length of time, such as 4 weeks, 6 months, 1 year, or the like.

Based on a determination that the data is associated with the characteristic ("Yes" at operation 808), the server 102, at operation 812, can store the data in a database based at least in part on the specified data retention rule. In various examples, based on a determination that the data is associated with the characteristic, the server 102 can associate an indicator therewith. The indicator can include an indication to retain the data per the specified data retention rule. In some examples, the indicator can include an indication to not delete the data. In such examples, the data may be retained (e.g., not deleted) in the database until the indicator is dissociated from the data.

In some examples, the indicator may be dissociated based on a determination that a pre-determined period of time associated with the specified data retention rule has expired. In such examples, based on a determination that a current time is after the pre-determined period of time, the server 102 may automatically dissociate the indicator from the data. In some examples, the indicator may be associated with the data until the server 102 receives a second request to cancel or otherwise remove the specified data retention rule associated with the characteristic. In such examples, responsive to receiving the second request, the server 102 may remove the indicator (e.g., dissociate the indicator) from the data.

Techniques described above with reference to FIGS. 1-8 are directed to, among other things, enabling a user of an organization to establish a data retention rule for communications associated with the organization, such as to delete communications that have been stored for a first period of time, and to specify the data retention rule for communications including a particular characteristic, such as to store a communication including the particular characteristic for a second period of time. That is, in at least one example, the user, who may be an administrator of an account associated with an organization, can cause the communication platform to store data associated with a particular user, workspace, communication channel, and/or direct message instance for the second period of time that is different from the first period of time associated with a data retention rule. The data can include messages sent via the communication platform, such as a direct message or a message associated with a communication channel. The data can include a string of text, emojis, symbols, and the like. The data can also include an attachment, such as a document, and/or photograph. Additionally, the data can include metadata associated with the data, such as a time (e.g., timestamp, generation time, transmission time, delivery time, etc.), one or more identifiers (e.g., user identifier, organization identifier, communication channel identifier, direct message instance identifier, workspace identifier, etc.), and the like.

From the server perspective, techniques described herein greatly enhance an amount of storage available to a server computing device for storing communications. As discussed above, existing technologies may require that organizations that are or may be subject to legal proceedings store any communications transmitted via the communication platform, regardless of the users associated with the communications. For example, using an existing system, an organization involved in or that anticipates potentially being involved in litigation may be required to store all communications associated with all employees, regardless of whether the employees may have a nexus to the litigation or the potential future litigation. This can require a significant amount of storage space and processing power to manage the data stored in the database.

Improving on the existing technologies, the techniques described herein enable an organization to designate a data retention rule, such as to reduce a total amount of stored data associated therewith, while also establishing a specified data retention rule associated with particular users, channels, workspaces, etc., such that data associated with the particular users, channels, workspaces, etc. is stored (potentially) longer than other data stored based on the data retention rule. Because the techniques described herein enable any organization, even those that are subject or that may be subject to legal proceedings, to designate a data retention rule, the techniques described herein reduce a total amount of data stored in association with an organization, while also enabling the organization to remain in compliance with one or more data retention policies associated with litigation. As such, the techniques described herein may improve the functioning of a server computing device by reducing an amount of memory and processing power required to manage the data stored in the memory.

As such, techniques described herein provide specific, technical solutions to technical problems faced by existing systems, the details of which are described above.

Conclusion

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented by a server computing device associated with a group-based communication platform, the method comprising:
   receiving, from a first computing device of a first user, a first request to retain data associated with a characteristic for a first period of time that is different than a second period of time designated by a data retention rule;
   storing, based at least in part on receiving the first request, a first instruction to associate an indicator with at least one of received or incoming data, associated with the characteristic, transmitted via the group-based communication platform;
   receiving a first message transmitted via the group-based communication platform, wherein the first message is associated with the characteristic;
   associating the first message with the indicator based at least in part on a determination that the first message is associated with the characteristic;
   retaining, based at least in part on the first message being associated with the indicator, the first message in a database associated with the group-based communication platform after expiration of the second period of time designated by the data retention rule,
   receiving, from a second computing device associated with a second user of the group-based communication platform and after the expiration of the second period of time but before an expiration of the first period of time, a second request to access a conversation associated with the first message; and
   withholding the first message from content presented via the conversation associated with the first message.

2. The method of claim 1, further comprising:
   receiving, from the first computing device, a third request to receive stored data associated with the characteristic; and
   sending, to the first computing device and based at least in part on the third request, the stored data comprising at least the first message.

3. The method of claim 1, wherein the characteristic comprises at least one of:
   a second user;
   a communication channel;
   a workspace;
   an organization;
   a range of dates; or
   a group of users.

4. The method of claim 1, further comprising:
   receiving, from the first computing device, a third request to exclude a communication channel of the group-based communication platform from the first instruction;
   receiving a second message transmitted via the communication channel, wherein the second message is associated with the characteristic; and
   storing the second message in the database based at least in part on the data retention rule.

5. The method of claim 1, further comprising:
   receiving, from the first computing device, a third request to cancel the first request;
   based at least in part on receiving the third request, causing the indicator to be dissociated from previously stored data associated with the characteristic;
   removing, based at least in part on causing the indicator to be dissociated from the previously stored data, the previously stored data from the database;
   receiving a second message, associated with the characteristic, transmitted via the group-based communication platform; and
   storing the second message in the database based at least in part on the data retention rule.

6. The method of claim 1, further comprising:
   receiving a second message; and
   based on a determination that the second message is not associated with the characteristic, storing the second message based on the data retention rule.

7. The method of claim 1, wherein the first request is received via at least one of:
   a first user interface associated with the group-based communication platform, wherein the first user is associated with an administrator account of a group of the group-based communication platform; or a second user interface associated with a third-party resource, wherein the first request is received via an application programming interface.

8. The method of claim 1, wherein the first message is transmitted via a communication channel or a direct messaging instance.

9. The method of claim 1, further comprising:
determining that a current time is after an end of the first period of time; and
dissociating the indicator from the first message.

10. A system comprising:
one or more processors; and
one or more computer readable media storing instructions that, when executed, cause the one or more processors to perform operations comprising:
receiving, from a first computing device of a first user associated with a group of a group-based communication platform, a first request to store data, associated with a characteristic, transmitted via the group-based communication platform, for a first period of time in a database associated with the group, wherein the first period of time is different than a second period of time for retaining data per a data retention rule;
receiving, from a second computing device associated with a second user, a first message transmitted via the group-based communication platform;
responsive to a determination that the first message is associated with the characteristic, storing the first message in the database for the first period of time;
receiving, from a third computing device associated with a third user of the group-based communication platform and after an expiration of the second period of time but before an expiration of the first period of time, a second request to access a conversation associated with the first message; and
withholding the first message from content presented in association with the conversation.

11. The system of claim 10, wherein the operations further comprise:
storing, based at least in part on receiving the first request, an instruction to associate an indicator with at least one of received or incoming data, associated with the characteristic, transmitted via the group-based communication platform; and
associating the first message with the indicator based at least in part on the determination that the first message is associated with the characteristic.

12. The system of claim 11, wherein the operations further comprise:
receiving, from the first computing device, a third request to cancel the first request;
based at least in part on receiving the third request, causing the indicator to be dissociated from previously stored data associated with the characteristic;
removing, based at least in part on causing the indicator to be dissociated from the previously stored data, the previously stored data from the database;
receiving a second message, associated with the characteristic, transmitted via the group-based communication platform; and
storing the second message in the database based at least in part on the data retention rule.

13. The system of claim 10, wherein the operations further comprise:
receiving, from the first computing device, a third request to receive stored data associated with the characteristic; and sending, to the first computing device based at least in part on the third request, the stored data comprising at least the first message.

14. The system of claim 10, wherein the operations further comprise:
receiving, from the first computing device, a third request to exclude a communication channel of the group-based communication platform from a specified data retention rule associated with the characteristic;
receiving a second message transmitted via the communication channel, wherein the second message is associated with the characteristic; and
storing the second message in the database according to the data retention rule based at least in part on the third request.

15. The system of claim 10, wherein storing the first message in the database comprises storing message data associated with the first message, the message data associated with the first message comprising at least one of:
an emoji associated with the first message;
a reactji associated with the first message;
a file associated with the first message;
an edit to the first message; or
a deletion associated with at least a portion of the first message.

16. One or more non-transitory computer readable media storing computer-executable instructions that, when executed by one or more processors of a server computing device, cause the server computing device to perform operations comprising:
receiving, from a first computing device of a first user associated with a group of a group-based communication platform, a request to store data, associated with a characteristic, transmitted via the group-based communication platform, for a first period of time in a database associated with the group, wherein the first period of time is different than a second period of time for retaining data per a data retention rule;
receiving, from a second computing device associated with a second user, a first message transmitted via the group-based communication platform;
responsive to a determination that the first message is associated with the characteristic, storing the first message in the database for the first period of time;
receiving, from a third computing device associated with a third user of the group-based communication platform and after an expiration of the second period of time but before an expiration of the first period of time, a second request to access a conversation associated with the first message; and
withholding the first message from content presented in association with the conversation.

17. The one or more non-transitory computer readable media of claim 16, wherein the operations further comprise:
storing, based at least in part on receiving the request, an instruction to associate an indicator with at least one of received or incoming data, associated with the characteristic, transmitted via the group-based communication platform; and
associating the first message with the indicator based at least in part on the determination that the first message is associated with the characteristic.

18. The one or more non-transitory computer readable media of claim 16, wherein the operations further comprise:
receiving, from the first computing device, a third request to receive stored data associated with the characteristic; and sending, to the first computing device based at least in part on the third request, the stored data comprising at least the first message.

19. The one or more non-transitory computer readable media of claim 16, wherein the operations further comprise:
receiving, from the first computing device, a third request to exclude a communication channel of the group-based communication platform from a specified data retention rule associated with the characteristic;
receiving a second message transmitted via the communication channel, wherein the second message is associated with the characteristic; and
storing the second message in the database according to the data retention rule based at least in part on the third request.

20. The one or more non-transitory computer readable media of claim 17, wherein the operations further comprise:
determining that a current time is after an end of the first period of time; and
dissociating the indicator from the first message.

* * * * *